(12) United States Patent
Huang

(10) Patent No.: US 11,709,343 B2
(45) Date of Patent: Jul. 25, 2023

(54) FIVE-PIECE INFRARED SINGLE FOCUS LENS SYSTEM INCLUDING FIVE LENSES OF +−+++, +−++−, OR +++−+ REFRACTIVE POWERS

(71) Applicant: NEWMAX TECHNOLOGY CO., LTD., Taichung (TW)

(72) Inventor: Ching-Yun Huang, Taichung (TW)

(73) Assignee: NEWMAX TECHNOLOGY CO., LTD., Taichung (TW)

( * ) Notice: Subject to any disclaimer, the term of this patent is extended or adjusted under 35 U.S.C. 154(b) by 345 days.

(21) Appl. No.: 17/022,088

(22) Filed: Sep. 16, 2020

(65) Prior Publication Data

US 2022/0121006 A1   Apr. 21, 2022

(30) Foreign Application Priority Data

Apr. 15, 2020  (TW) .................................. 109112596

(51) Int. Cl.
   *G02B 13/00*    (2006.01)
   *G02B 13/14*    (2006.01)
   *G02B 9/60*     (2006.01)
(52) U.S. Cl.
   CPC ........... *G02B 13/0045* (2013.01); *G02B 9/60* (2013.01); *G02B 13/14* (2013.01)

(58) Field of Classification Search
   CPC ....... G02B 13/0045; G02B 9/60; G02B 13/14
   See application file for complete search history.

(56) References Cited

U.S. PATENT DOCUMENTS

| 2015/0286035 | A1* | 10/2015 | Lin ..................... G02B 13/0045 |
| | | | 359/714 |
| 2021/0231918 | A1* | 7/2021 | Chang ................ G02B 13/0045 |
| 2022/0187577 | A1* | 6/2022 | Zhang ..................... G02B 9/60 |

* cited by examiner

*Primary Examiner* — Wen Huang
(74) *Attorney, Agent, or Firm* — Bruce Stone LLP; Joseph A. Bruce

(57) ABSTRACT

A five-piece infrared single focus lens system includes, in order from the object side to the image side: a stop, a first lens element with a positive refractive power, a second lens element, a third lens element with a positive refractive power, a fourth lens element, a fifth lens element, wherein a focal length of the first lens element is f1, a focal length of the third lens element is f3, a central thickness of the first lens element along an optical axis is CT1, a central thickness of the third lens element along the optical axis is CT3, a radius of curvature of an object-side surface of the first lens element is R1, a radius of curvature of an object-side surface of the third lens element is R5, satisfying the relation: −1.60<(f1×CT1×R1)/(f3×CT3×R5)<2.43. Such a system has a wide field of view, high resolution, short length and less distortion.

15 Claims, 18 Drawing Sheets

FIVE-PIECE INFRARED SINGLE FOCUS LENS SYSTEM INCLUDING FIVE LENSES OF +−+++, +−++−, OR +++−+ REFRACTIVE POWERS

BACKGROUND

Field of the Invention

The present invention relates to a five-piece lens system, and more particularly to a miniaturized five-piece infrared single focus lens system applicable to electronic products.

Description of the Prior Art

Nowadays digital imaging technology is constantly innovating and changing, in particular, digital carriers, such as, digital camera and mobile phone and so on, have become smaller in size, so CCD (Charge Coupled Device) or CMOS (Complementary Metal Oxide Semiconductor) sensor is also required to be more compact. In addition to be used in the field of photography, in recent years, infrared focusing lens has also be used in infrared receiving and sensing field of the game machine, and in order to make the scope of game machine induction user more broader, wide-angle lens group has become the mainstream for receiving infrared wavelength at present.

The applicant has also put forward a number of lens groups related to infrared wavelength reception, however, at present, the game machine is based on a more three-dimensional, real and immediate 3D game, the current or the applicant's previous lens groups are all 2D plane games, which cannot meet the 3D game focusing on the deep induction efficacy.

Special infrared receiving and induction lens groups for game machines are made of plastic for the pursuit of low cost, however, poor material transparency is one of the key factors that affect the depth detection accuracy of the game machine, and plastic lenses are easy to overheat or too cold in ambient temperature, so that the focal length of the lens group will be changed and cannot focus accurately. Therefore, the current infrared receiving and induction lens groups cannot meet the 3D game depth precise induction requirement.

The present invention mitigates and/or obviates the aforementioned disadvantages.

SUMMARY

The primary objective of the present invention is to provide a five-piece infrared single focus lens system which has a wide field of view, high resolution, short length and less distortion.

Therefore, a five-piece infrared single focus lens system in accordance with the present invention comprises a stop and a lens group having five lens elements, in order from an object side to an image side: the stop; a first lens element with a positive refractive power having an object-side surface being convex near an optical axis, at least one of the object-side surface and an image-side surface of the first lens element being aspheric; a second lens element with a refractive power having an object-side surface being concave near the optical axis and an image-side surface being convex near the optical axis, at least one of the object-side surface and the image-side surface of the second lens element being aspheric; a third lens element with a positive refractive power, at least one of an object-side surface and an image-side surface of the third lens element being aspheric; a fourth lens element with a refractive power having an object-side surface being concave near the optical axis and an image-side surface being convex near the optical axis, at least one of the object-side surface and the image-side surface of the fourth lens element being aspheric; and a fifth lens element with a refractive power having an object-side surface being convex near the optical axis and an image-side surface being concave near the optical axis, at least one of the object-side surface and the image-side surface of the fifth lens element being aspheric and provided with at least one inflection point.

Wherein a focal length of the first lens element is f1, a focal length of the third lens element is f3, a central thickness of the first lens element along the optical axis is CT1, a central thickness of the third lens element along the optical axis is CT3, a radius of curvature of the object-side surface of the first lens element is R1, a radius of curvature of the object-side surface of the third lens element is R5, and they satisfy the relation: $-1.60 < (f1 \times CT1 \times R1)/(f3 \times CT3 \times R5) < 2.43$.

Preferably, a focal length of the five-piece infrared single focus lens system is f, the focal length of the first lens element is f1, and they satisfy the relation: $0.9 < f1/f < 2.2$, which maintains the refraction force of the first lens element in the proper range and the field of view (FOV) of the system at the appropriate angle, while reducing the assembly sensitivity of the first lens element.

Preferably, the focal length of the first lens element is f1, the focal length of the third lens element is f3, and they satisfy the relation: $0.74 < f3/f1 < 4.30$, which makes the five-piece infrared single focus lens system has an appropriate distribution of refractive power, it will be favorable to adjust the angle of view and compress volume.

Preferably, a focal length of the first lens element and the second lens element combined is f12, the focal length of the third lens element is f3, and they satisfy the relation: $0.28 < f12/f3 < 3.07$, so that the resolution can be improved evidently.

Preferably, the focal length of the first lens element and the second lens element combined is f12, a focal length of the first lens element, the second lens element, the third lens element and the fourth lens element combined is f1234, and they satisfy the relation: $0.70 < f12/f1234 < 3.91$, so that a wide field of view can be provided and the resolution can be improved evidently.

Preferably, the focal length of the five-piece infrared single focus lens system is f, a focal length of the first lens element, the second lens element and the third lens element combined is f123, and they satisfy the relation: $0.36 < f/f123 < 1.33$, so that light at a wider angle of view can be incident to the system, so as to improve the peripheral illuminance and enlarge the angle of view.

Preferably, the focal length of the first lens element is f1, the radius of curvature of the object-side surface of the first lens element is R1, and they satisfy the relation: $0.98 < f1/R1 < 2.97$, which is helpful for the regulation of incident light, especially for the incident light with large angle of view.

Preferably, a radius of curvature of the image-side surface of the second lens element is R4, a radius of curvature of the object-side surface of the second lens element is R3, and they satisfy the relation: $0.71 < R4/R3 < 2.75$, so that it can correct the image curvature and improve the image quality.

Preferably, a radius of curvature of the object-side surface of the fourth lens element is R7, a radius of curvature of the image-side surface of the fourth lens element is R8, and they satisfy the relation: 0.38<R7/R8<7.81, so that it can correct the image curvature and improve the image quality.

Preferably, a radius of curvature of the object-side surface of the fifth lens element is R9, a radius of curvature of the image-side surface of the fifth lens element is R10, and they satisfy the relation: 0.66<R9/R10<1.75, so that it can slow down the change of the thickness of the fifth lens element near the optical axis to the off-axis, and alleviate the bad forming caused by the excessive difference of the thickness from the off-axis.

Preferably, the focal length of the third lens element is f3, the radius of curvature of the object-side surface of the third lens element is R5, and they satisfy the relation: −15.0<f3/R5<4.9, so as to improve the lens formability.

Preferably, a distance from the object-side surface of the first lens element to an image plane along the optical axis is TL, a central thickness of the second lens element along the optical axis is CT2, the central thickness of the third lens element along the optical axis is CT3, a central thickness of the fourth lens element along the optical axis is CT4, and they satisfy the relation: 2.5<TL/(CT2+CT3+CT4)<8.1, it will be favorable to maintain the objective of miniaturization of the five-piece infrared single focus lens system, which can be used in thin electronic products.

Preferably, the distance from the object-side surface of the first lens element to the image plane along the optical axis is TL, the focal length of the five-piece infrared single focus lens system is f, and they satisfy the relation: 1.06<TL/f<2.07, it will be favorable to obtain a wide field of view and maintain the objective of miniaturization of the five-piece infrared single focus lens system, which can be used in thin electronic products.

Preferably, a distance from the image-side surface of the fifth lens element to the image plane along the optical axis is BFL, the distance from the object-side surface of the first lens element to the image plane along the optical axis is TL, and they satisfy the relation: 0.15<BFL/TL<0.39, so that it can obtain appropriate rear focus.

Preferably, the distance from the object-side surface of the first lens element to the image plane along the optical axis is TL, half of an image height that can be captured by the five-piece infrared single focus lens system on the image plane is IMH, and they satisfy the relation: 1.4<TL/IMH<2.6, so that the reducing of the volume of the system and the increasing of the image plane area can be balanced.

Preferably, a focal length of the second lens element is f2, the central thickness of the second lens element along the optical axis is CT2, the radius of curvature of the object-side surface of the second lens element is R3, the radius of curvature of the image-side surface of the second lens element is R4, and they satisfy the relation: −1.72<f2×CT2/(R3×R4)<0.48, so as to improve the lens formability.

The present invention will be presented in further details from the following descriptions with the accompanying drawings, which show, for purpose of illustrations only, the preferred embodiments in accordance with the present invention.

DETAILED DESCRIPTION

Figure 1A:
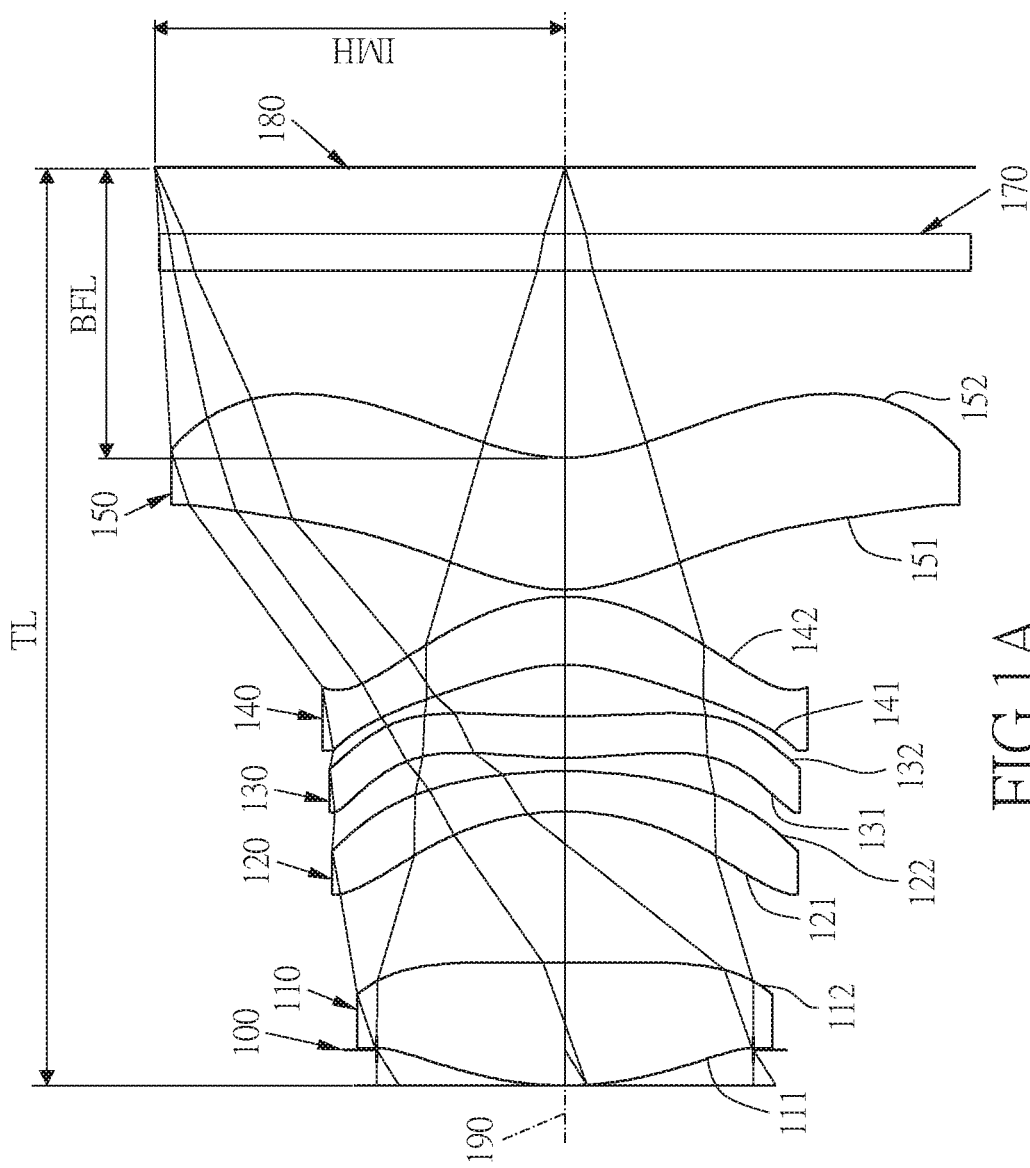
FIG. 1A shows a five-piece infrared single focus lens system in accordance with a first embodiment of the present invention.
Figure 1B:
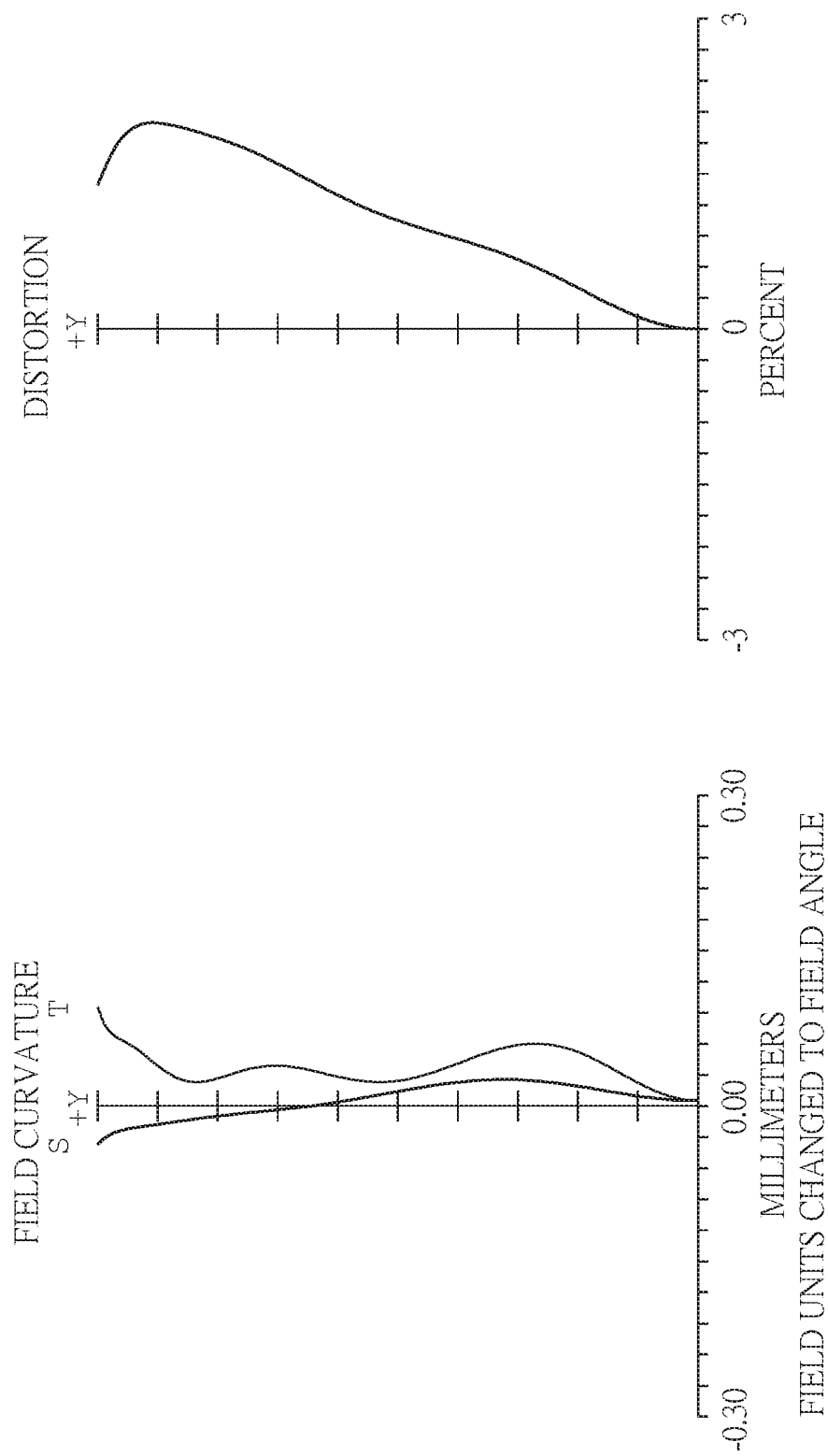
FIG. 1B shows the image plane curve and the distortion curve of the first embodiment of the present invention.

Referring to FIGS. 1A and 1B, FIG. 1A shows a five-piece infrared single focus lens system in accordance with a first embodiment of the present invention, and FIG. 1B shows, in order from left to right, the image plane curve and the distortion curve of the first embodiment of the present invention. A five-piece infrared single focus lens system in accordance with the first embodiment of the present invention comprises a stop 100 and a lens group. The lens group comprises, in order from an object side to an image side: a first lens element 110, a second lens element 120, a third lens element 130, a fourth lens element 140, a fifth lens element 150, an IR band-pass element 170, and an image plane 180, wherein the five-piece infrared single focus lens system has a total of five lens elements with refractive power. The stop 100 is disposed between an object to be imaged and the first lens element 110.

The first lens element 110 with a positive refractive power has an object-side surface 111 being convex near an optical axis 190 and an image-side surface 112 being concave near the optical axis 190, the object-side surface 111 and the image-side surface 112 are aspheric, and the first lens element 110 is made of plastic material.

The second lens element 120 with a negative refractive power has an object-side surface 121 being concave near the optical axis 190 and an image-side surface 122 being convex near the optical axis 190, the object-side surface 121 and the image-side surface 122 are aspheric, and the second lens element 120 is made of plastic material.

The third lens element 130 with a positive refractive power has an object-side surface 131 being convex near the optical axis 190 and an image-side surface 132 being concave near the optical axis 190, the object-side surface 131 and the image-side surface 132 are aspheric, and the third lens element 130 is made of plastic material.

The fourth lens element 140 with a positive refractive power has an object-side surface 141 being concave near the optical axis 190 and an image-side surface 142 being convex near the optical axis 190, the object-side surface 141 and the image-side surface 142 are aspheric, and the fourth lens element 140 is made of plastic material.

The fifth lens element 150 with a positive refractive power has an object-side surface 151 being convex near the optical axis 190 and an image-side surface 152 being concave near the optical axis 190, the object-side surface 151 and the image-side surface 152 are aspheric and are provided with at least one inflection point, the fifth lens element 150 is made of plastic material.

The IR band-pass element 170 made of glass is located between the fifth lens element 150 and the image plane 180 and has no influence on the focal length of the five-piece infrared single focus lens system.

The equation for the aspheric surface profiles of the respective lens elements of the first embodiment is expressed as follows:

$$z = \frac{ch^2}{1+[1-(k+1)c^2h^2]^{0.5}} + Ah^4 + Bh^6 + Ch^8 + Dh^{10} + Eh^{12} + Fh^{14} + Gh^{16}$$

wherein:

z represents the value of a reference position with respect to a vertex of the surface of a lens and a position with a height h along the optical axis 190;

c represents a paraxial curvature equal to 1/R (R: a paraxial radius of curvature);

h represents a vertical distance from the point on the curve of the aspheric surface to the optical axis 190;

k represents the conic constant;

A, B, C, D, E, F, G, . . . : represent the high-order aspheric coefficients.

In the first embodiment of the present five-piece infrared single focus lens system, a focal length of the five-piece infrared single focus lens system is f, a f-number of the five-piece infrared single focus lens system is Fno, the five-piece infrared single focus lens system has a maximum view angle (field of view) FOV, and they satisfy the relations: f=3.64 mm; Fno=1.45; and FOV=73.0 degrees.

In the first embodiment of the present five-piece infrared single focus lens system, a focal length of the first lens element 110 is f1, a focal length of the third lens element 130 is f3, a central thickness of the first lens element 110 along the optical axis 190 is CT1, a central thickness of the third lens element 130 along the optical axis 190 is CT3, a radius of curvature of the object-side surface 111 of the first lens element 110 is R1, a radius of curvature of the object-side surface 131 of the third lens element 130 is R5, and they satisfy the relation: (f1×CT1×R1)/(f3×CT3×R5)=0.50.

In the first embodiment of the present five-piece infrared single focus lens system, the focal length of the five-piece infrared single focus lens system is f, the focal length of the first lens element 110 is f1, and they satisfy the relation: f1/f=1.26.

In the first embodiment of the present five-piece infrared single focus lens system, the focal length of the first lens element 110 is f1, the focal length of the third lens element 130 is f3, and they satisfy the relation: f3/f1=3.58.

In the first embodiment of the present five-piece infrared single focus lens system, a focal length of the first lens element 110 and the second lens element 120 combined is f12, the focal length of the third lens element 130 is f3, and they satisfy the relation: f12/f3=0.50.

In the first embodiment of the present five-piece infrared single focus lens system, the focal length of the first lens element 110 and the second lens element 120 combined is f12, a focal length of the first lens element 110, the second lens element 120, the third lens element 130 and the fourth lens element 140 combined is f1234, and they satisfy the relation: f12/f1234=1.33.

In the first embodiment of the present five-piece infrared single focus lens system, the focal length of the five-piece infrared single focus lens system is f, a focal length of the first lens element 110, the second lens element 120 and the third lens element 130 combined is f123, and they satisfy the relation: f/f123=0.60.

In the first embodiment of the present five-piece infrared single focus lens system, the focal length of the first lens element 110 is f1, the radius of curvature of the object-side surface 111 of the first lens element 110 is R1, and they satisfy the relation: f1/R1=1.67.

In the first embodiment of the present five-piece infrared single focus lens system, a radius of curvature of the image-side surface 122 of the second lens element 120 is R4, a radius of curvature of the object-side surface 121 of the second lens element 120 is R3, and they satisfy the relation: R4/R3=2.10.

In the first embodiment of the present five-piece infrared single focus lens system, a radius of curvature of the object-side surface 141 of the fourth lens element 140 is R7, a radius of curvature of the image-side surface 142 of the fourth lens element 140 is R8, and they satisfy the relation: R7/R8=0.94.

In the first embodiment of the present five-piece infrared single focus lens system, a radius of curvature of the object-side surface 151 of the fifth lens element 150 is R9, a radius of curvature of the image-side surface 152 of the fifth lens element 150 is R10, and they satisfy the relation: R9/R10=0.93.

In the first embodiment of the present five-piece infrared single focus lens system, the focal length of the third lens element 130 is f3, the radius of curvature of the object-side surface 131 of the third lens element 130 is R5, and they satisfy the relation: f3/R5=3.59.

In the first embodiment of the present five-piece infrared single focus lens system, a distance from the object-side surface 111 of the first lens element 110 to the image plane 180 along the optical axis 190 is TL, a central thickness of the second lens element 120 along the optical axis 190 is CT2, the central thickness of the third lens element 130 along the optical axis 190 is CT3, a central thickness of the fourth lens element 140 along the optical axis 190 is CT4, and they satisfy the relation: TL/(CT2+CT3+CT4)=6.15.

In the first embodiment of the present five-piece infrared single focus lens system, the distance from the object-side surface 111 of the first lens element 110 to the image plane 180 along the optical axis 190 is TL, the focal length of the five-piece infrared single focus lens system is f, and they satisfy the relation: TL/f=1.44.

In the first embodiment of the present five-piece infrared single focus lens system, a distance from the image-side surface 152 of the fifth lens element 150 to the image plane 180 along the optical axis 190 is BFL, the distance from the object-side surface 111 of the first lens element 110 to the image plane 180 along the optical axis 190 is TL, and they satisfy the relation: BFL/TL=0.32.

In the first embodiment of the present five-piece infrared single focus lens system, the distance from the object-side surface 111 of the first lens element 110 to the image plane 180 along the optical axis 190 is TL, half of an image height that can be captured by the five-piece infrared single focus lens system on the image plane 180 is IMH, and they satisfy the relation: TL/IMH=1.91.

In the first embodiment of the present five-piece infrared single focus lens system, a focal length of the second lens element 120 is f2, the central thickness of the second lens element 120 along the optical axis 190 is CT2, the radius of curvature of the object-side surface 121 of the second lens element 120 is R3, the radius of curvature of the image-side surface 122 of the second lens element 120 is R4, and they satisfy the relation: f2×CT2/(R3×R4)=−0.19.

The detailed optical data of the first embodiment is shown in table 1, and the aspheric surface data is shown in table 2.

TABLE 1

Embodiment 1
(focal length) = 3.64 mm, Fno = 1.45, FOV = 73.0 deg.

| surface | | Curvature Radius | | Thickness | Material | Index | Abbe # | Focal length |
|---|---|---|---|---|---|---|---|---|
| 0 | object | infinity | | 700.000 | | | | |
| 1 | test surface | infinity | | 0.203 | | | | |
| 2 | stop | infinity | | −0.203 | | | | |
| 3 | Lens 1 | 2.744 | (ASP) | 0.702 | plastic | 1.64 | 22.5 | 4.57 |
| 4 | | 74.154 | (ASP) | 0.859 | | | | |
| 5 | Lens 2 | −2.077 | (ASP) | 0.228 | plastic | 1.54 | 55.9 | −7.66 |
| 6 | | −4.366 | (ASP) | 0.079 | | | | |
| 7 | Lens 3 | 4.559 | (ASP) | 0.235 | plastic | 1.64 | 22.5 | 16.37 |
| 8 | | 8.102 | (ASP) | 0.294 | | | | |
| 9 | Lens 4 | −1.265 | (ASP) | 0.386 | plastic | 1.64 | 22.5 | 45.27 |
| 10 | | −1.352 | (ASP) | 0.040 | | | | |
| 11 | Lens 5 | 1.333 | (ASP) | 0.752 | plastic | 1.64 | 22.5 | 7.97 |
| 12 | | 1.430 | (ASP) | 1.065 | | | | |
| 13 | IR band-pass element | infinity | | 0.210 | glass | 1.52 | 64.2 | |
| 14 | | infinity | | 0.380 | | | | |
| 15 | Image plane | infinity | | infinity | | | | |

TABLE 2

Aspheric Coefficients

| | surface | | | | |
|---|---|---|---|---|---|
| | 3 | 4 | 5 | 6 | 7 |
| K: | 4.6399E−01 | −6.9865E+01 | 5.2911E−01 | −4.1772E−01 | −7.5083E+01 |
| A: | −7.0242E−03 | −2.4965E−02 | 2.0145E−02 | −1.5253E−02 | −3.9323E−02 |
| B: | −2.7913E−02 | −1.3590E−02 | −1.9051E−02 | 3.4838E−03 | −4.0482E−02 |
| C: | 1.8226E−02 | 1.5794E−03 | 1.6898E−02 | −1.0276E−02 | 1.9862E−03 |
| D: | −9.5703E−03 | −1.7629E−03 | 3.4644E−04 | 2.7180E−03 | 1.9356E−03 |
| E: | 4.9655E−04 | 2.4389E−04 | −4.9242E−04 | −4.5258E−05 | 6.0946E−04 |
| F: | 0.0000E+00 | 0.0000E+00 | 0.0000E+00 | 0.0000E+00 | 0.0000E+00 |
| G: | 0.0000E+00 | 0.0000E+00 | 0.0000E+00 | 0.0000E+00 | 0.0000E+00 |

| | surface | | | | |
|---|---|---|---|---|---|
| | 8 | 9 | 10 | 11 | 12 |
| K: | −9.6159E+00 | −9.1360E+00 | −2.9674E+00 | −6.5040E+00 | −5.8238E+00 |
| A: | −4.7690E−02 | 1.9675E−02 | −1.5520E−02 | −1.5218E−02 | −2.1560E−02 |
| B: | −1.3847E−02 | −1.3060E−02 | −1.8599E−03 | −5.1538E−03 | −2.6573E−04 |
| C: | −4.2394E−03 | −5.3040E−04 | 6.2010E−03 | 2.5199E−03 | 3.6296E−04 |
| D: | 9.1838E−04 | 4.1150E−04 | −2.9750E−04 | −3.4884E−04 | −4.6211E−05 |
| E: | 5.7282E−04 | −1.5700E−04 | 8.0656E−05 | 1.6217E−05 | 1.1138E−06 |
| F: | 0.0000E+00 | 0.0000E+00 | 0.0000E+00 | 0.0000E+00 | 0.0000E+00 |
| G: | 0.0000E+00 | 0.0000E+00 | 0.0000E+00 | 0.0000E+00 | 0.0000E+00 |

The units of the radius of curvature, the thickness and the focal length in table 1 are expressed in mm, the surface numbers 0-15 represent the surfaces sequentially arranged from the object-side to the image-side along the optical axis, and the test surface (i.e. surface 1). In table 2, k represents the conic coefficient of the equation of the aspheric surface profiles, and A, B, C, D, E, F, G . . . : represent the high-order aspheric coefficients. The tables presented below for each embodiment are the corresponding schematic parameter, image plane curves and distortion curves, and the definitions of the tables are the same as Table 1 and Table 2 of the first embodiment. Therefore, an explanation in this regard will not be provided again.

Figure 2A:
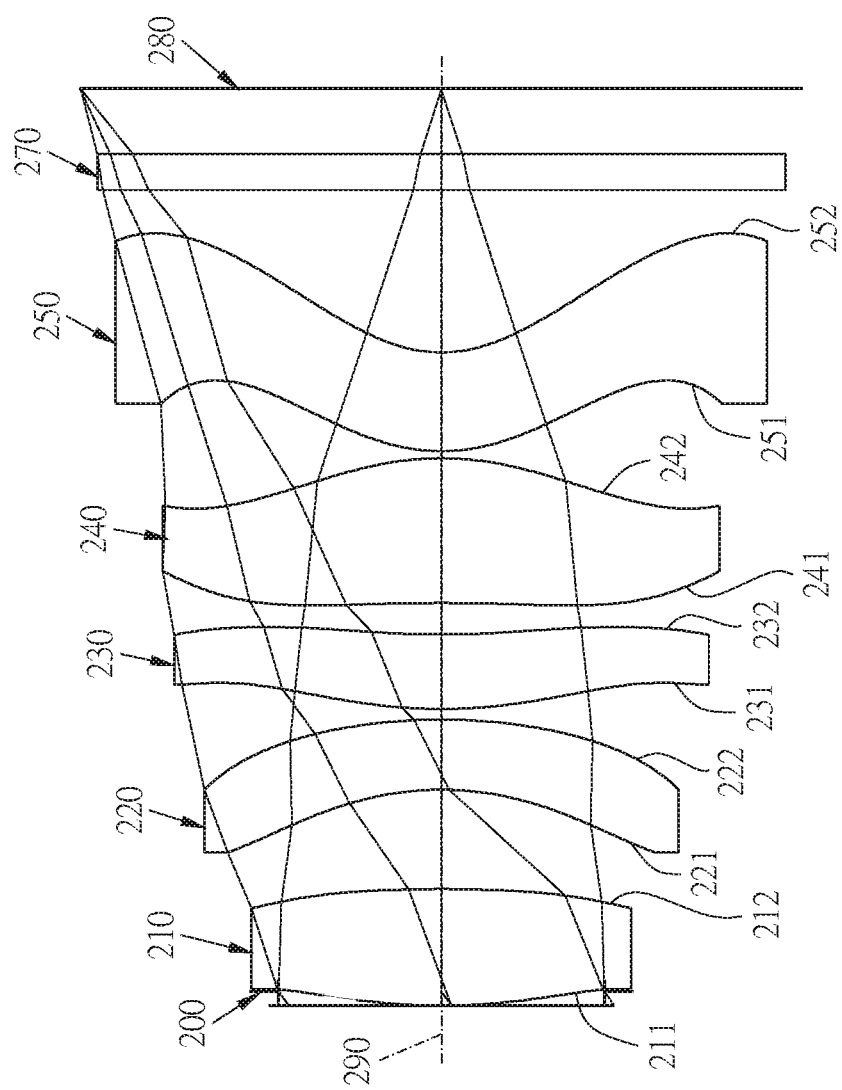
FIG. 2A shows a five-piece infrared single focus lens system in accordance with a second embodiment of the present invention.
Figure 2B:
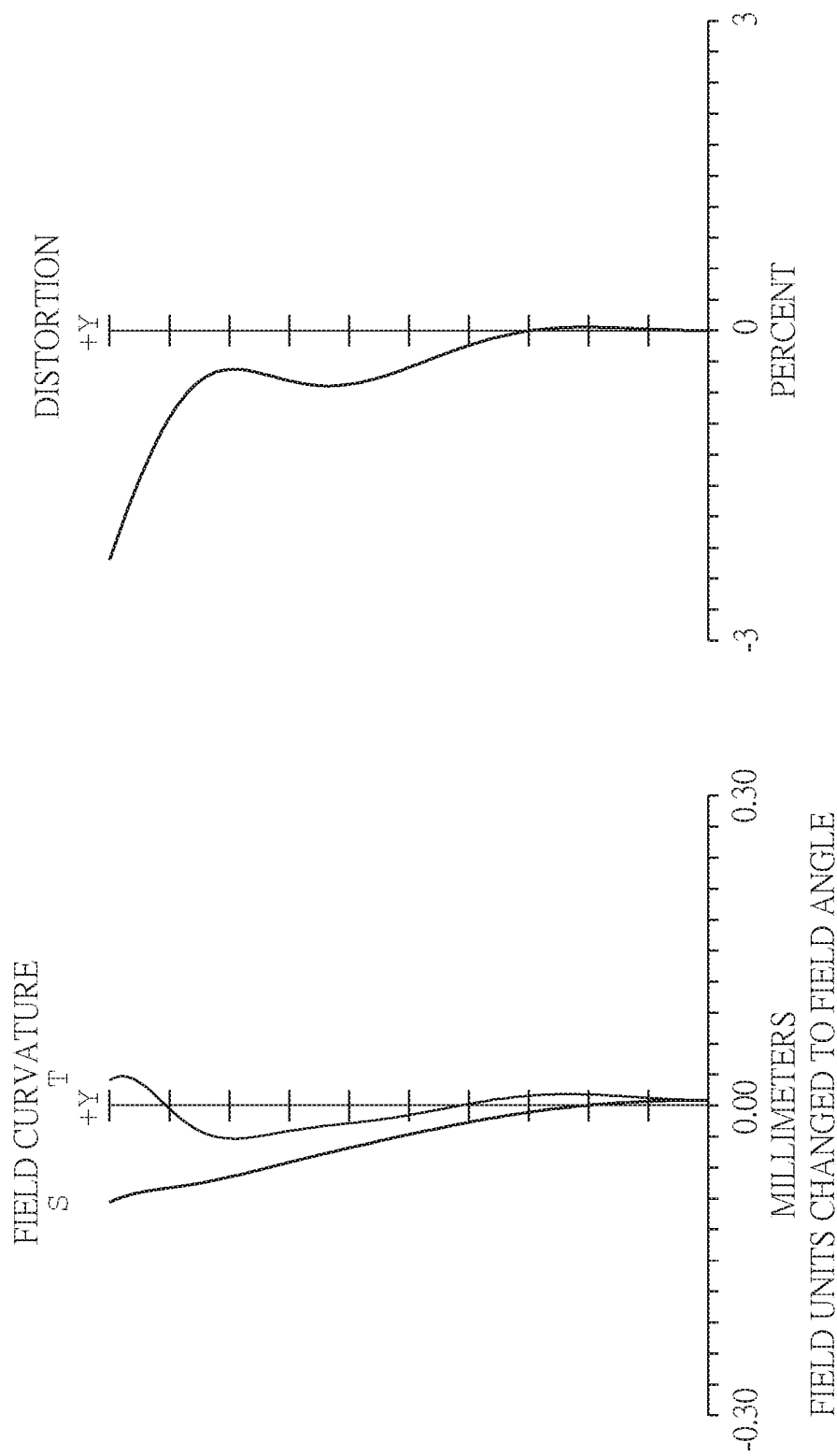
FIG. 2B shows the image plane curve and the distortion curve of the second embodiment of the present invention.

Referring to FIGS. 2A and 2B, FIG. 2A shows a five-piece infrared single focus lens system in accordance with a second embodiment of the present invention, and FIG. 2B shows, in order from left to right, the image plane curve and the distortion curve of the second embodiment of the present invention. A five-piece infrared single focus lens system in accordance with the second embodiment of the present invention comprises a stop 200 and a lens group. The lens group comprises, in order from an object side to an image side: a first lens element 210, a second lens element 220, a third lens element 230, a fourth lens element 240, a fifth lens element 250, an IR band-pass element 270, and an image plane 280, wherein the five-piece infrared single focus lens system has a total of five lens elements with refractive power. The stop 200 is disposed between an object to be imaged and the first lens element 210.

The first lens element 210 with a positive refractive power has an object-side surface 211 being convex near an optical axis 290 and an image-side surface 212 being convex near the optical axis 290, the object-side surface 211 and the image-side surface 212 are aspheric, and the first lens element 210 is made of plastic material.

The second lens element 220 with a negative refractive power has an object-side surface 221 being concave near the optical axis 290 and an image-side surface 222 being convex near the optical axis 290, the object-side surface 221 and the image-side surface 222 are aspheric, and the second lens element 220 is made of plastic material.

The third lens element 230 with a positive refractive power has an object-side surface 231 being convex near the optical axis 290 and an image-side surface 232 being concave near the optical axis 290, the object-side surface 231 and the image-side surface 232 are aspheric, and the third lens element 230 is made of plastic material.

The fourth lens element 240 with a positive refractive power has an object-side surface 241 being concave near the optical axis 290 and an image-side surface 242 being convex near the optical axis 290, the object-side surface 241 and the image-side surface 242 are aspheric, and the fourth lens element 240 is made of plastic material.

The fifth lens element 250 with a negative refractive power has an object-side surface 251 being convex near the optical axis 290 and an image-side surface 252 being concave near the optical axis 290, the object-side surface 251 and the image-side surface 252 are aspheric and are provided with at least one inflection point, the fifth lens element 250 is made of plastic material.

The IR band-pass element 270 made of glass is located between the fifth lens element 250 and the image plane 280 and has no influence on the focal length of the five-piece infrared single focus lens system.

The detailed optical data of the second embodiment is shown in table 3, and the aspheric surface data is shown in table 4.

TABLE 3

Embodiment 2
f(focal length) = 3.08 mm, Fno = 1.40, FOV = 78.0 deg.

| surface | | Curvature Radius | | Thickness | Material | Index | Abbe # | Focal length |
|---|---|---|---|---|---|---|---|---|
| 0 | object | infinity | | 450.000 | | | | |
| 1 | test surface | infinity | | 0.085 | | | | |
| 2 | stop | infinity | | −0.085 | | | | |
| 3 | Lens 1 | 4.568 | (ASP) | 0.674 | plastic | 1.64 | 22.5 | 5.62 |
| 4 | | −14.002 | (ASP) | 0.576 | | | | |
| 5 | Lens 2 | −2.432 | (ASP) | 0.406 | plastic | 1.54 | 55.9 | −10.74 |
| 6 | | −4.459 | (ASP) | 0.061 | | | | |
| 7 | Lens 3 | 3.963 | (ASP) | 0.431 | plastic | 1.64 | 22.5 | 16.09 |
| 8 | | 6.296 | (ASP) | 0.183 | | | | |
| 9 | Lens 4 | −14.760 | (ASP) | 0.838 | plastic | 1.64 | 22.5 | 4.21 |
| 10 | | −2.269 | (ASP) | 0.040 | | | | |
| 11 | Lens 5 | 1.443 | (ASP) | 0.571 | plastic | 1.64 | 22.5 | −15.34 |
| 12 | | 1.063 | (ASP) | 0.938 | | | | |
| 13 | IR band-pass element | infinity | | 0.210 | glass | 1.52 | 64.2 | |
| 14 | | infinity | | 0.380 | | | | |
| 15 | Image plane | infinity | | infinity | | | | |

TABLE 4

Aspheric Coefficients

| | surface | | | | |
|---|---|---|---|---|---|
| | 3 | 4 | 5 | 6 | 7 |
| K: | −4.4360E+00 | 8.0940E+01 | 6.8132E−01 | −4.8681E+00 | −1.2094E+01 |
| A: | −1.6186E−02 | −1.9808E−02 | 8.4526E−03 | −6.6334E−03 | 5.6838E−03 |
| B: | −4.5441E−03 | −1.0823E−03 | 1.4050E−02 | −4.1315E−03 | −1.2835E−02 |
| C: | 7.5166E−05 | 1.6896E−03 | −4.5985E−04 | −3.9959E−04 | 2.0064E−03 |
| D: | −7.0490E−06 | 1.0073E−03 | 1.4421E−04 | −1.1573E−04 | 0.0000E+00 |
| E: | 0.0000E+00 | 0.0000E+00 | 0.0000E+00 | 0.0000E+00 | 0.0000E+00 |
| F: | 0.0000E+00 | 0.0000E+00 | 0.0000E+00 | 0.0000E+00 | 0.0000E+00 |
| G: | 0.0000E+00 | 0.0000E+00 | 0.0000E+00 | 0.0000E+00 | 0.0000E+00 |

| | surface | | | | |
|---|---|---|---|---|---|
| | 8 | 9 | 10 | 11 | 12 |
| K: | −9.9500E+01 | −9.9500E+01 | −1.9783E+00 | −1.4491E+00 | −1.9376E+00 |
| A: | −1.4882E−02 | 1.2163E−02 | 3.6104E−02 | −5.4297E−02 | −4.5918E−02 |
| B: | 7.3618E−04 | 7.2903E−03 | −1.4647E−03 | −1.1282E−03 | 4.6728E−03 |
| C: | 2.9395E−05 | −1.2890E−03 | 1.2725E−04 | −2.2357E−04 | −3.8911E−04 |
| D: | 0.0000E+00 | 0.0000E+00 | 0.0000E+00 | 0.0000E+00 | 0.0000E+00 |
| E: | 0.0000E+00 | 0.0000E+00 | 0.0000E+00 | 0.0000E+00 | 0.0000E+00 |
| F: | 0.0000E+00 | 0.0000E+00 | 0.0000E+00 | 0.0000E+00 | 0.0000E+00 |
| G: | 0.0000E+00 | 0.0000E+00 | 0.0000E+00 | 0.0000E+00 | 0.0000E+00 |

In the second embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 3 and Table 4 as the following values and satisfy the following conditions:

| Embodiment 2 | | | |
|---|---|---|---|
| f[mm] | 3.08 | R7/R8 | 6.50 |
| Fno | 1.40 | R9/R10 | 1.36 |
| FOV[deg.] | 78.0 | f3/R5 | 4.06 |
| f1/f | 1.82 | TL/(CT2 + CT3 + CT4) | 3.17 |
| f3/f1 | 2.86 | TL/f | 1.72 |
| f12/f3 | 0.66 | BFL/TL | 0.29 |
| f12/f1234 | 3.26 | TL/IMH | 2.17 |
| f/f123 | 0.46 | f2 × CT2/(R3 × R4) | −0.40 |
| f1/R1 | 1.23 | (f1 × CT1 × R1)/ | 0.63 |
| R4/R3 | 1.83 | (f3 × CT3 × R5) | |

Figure 3A:
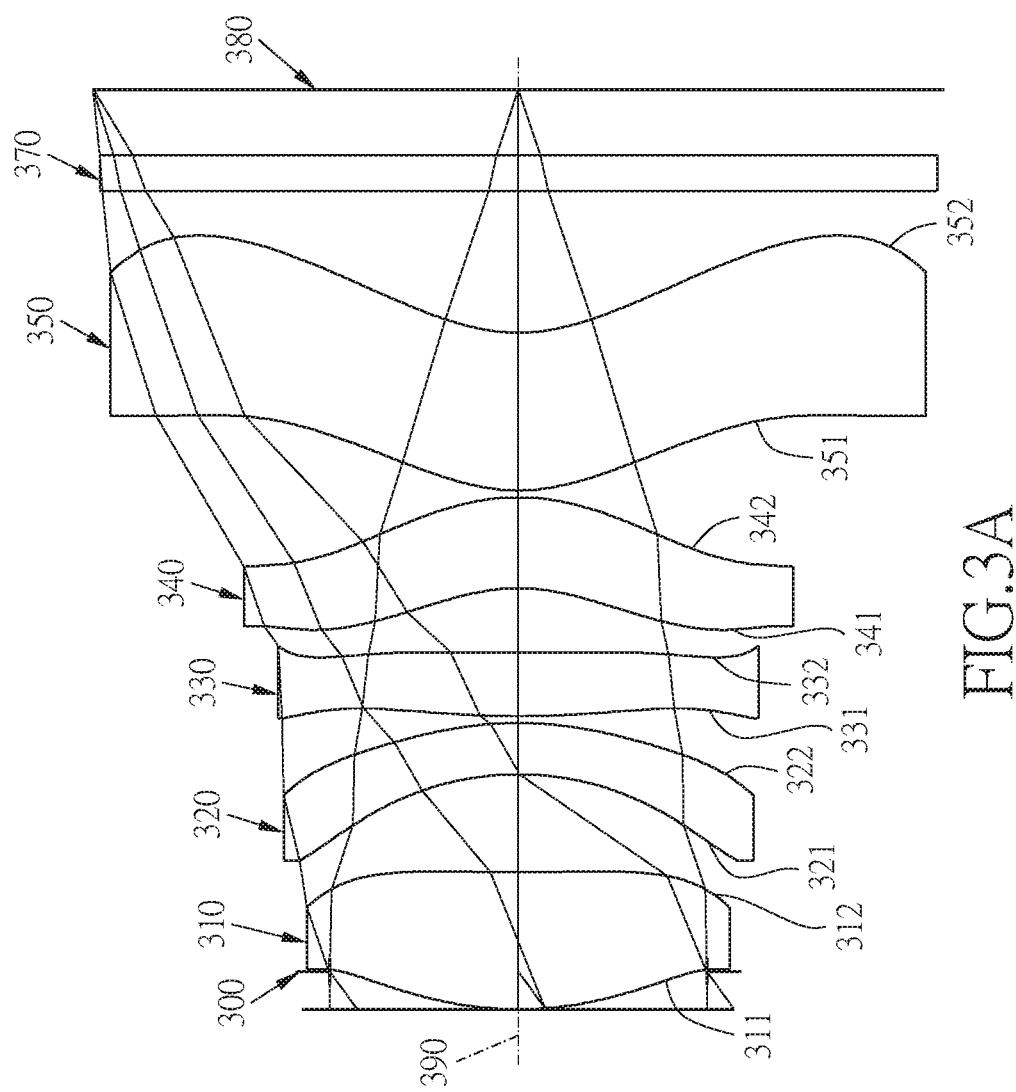
FIG. 3A shows a five-piece infrared single focus lens system in accordance with a third embodiment of the present invention.
Figure 3B:
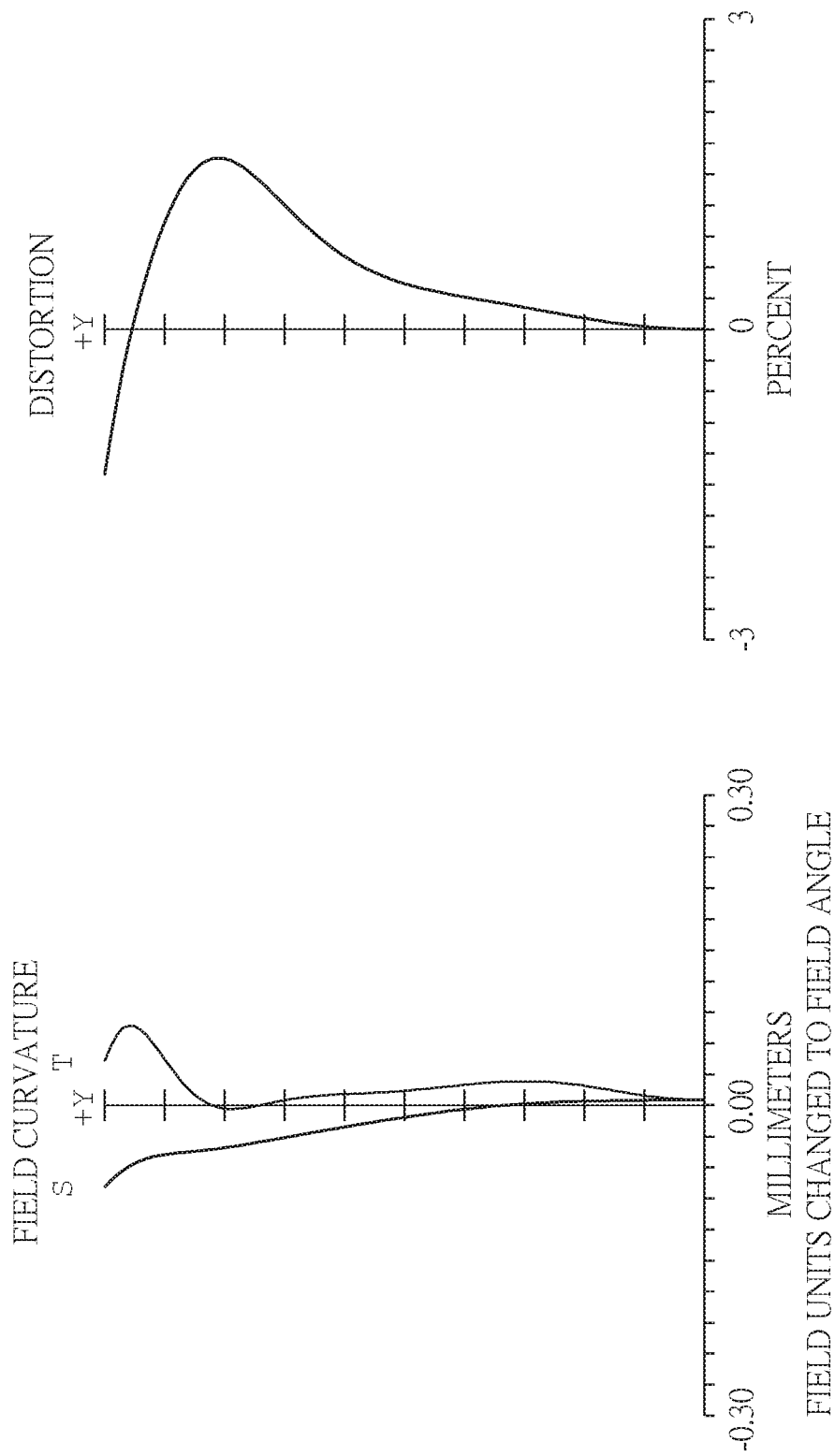
FIG. 3B shows the image plane curve and the distortion curve of the third embodiment of the present invention.

Referring to FIGS. 3A and 3B, FIG. 3A shows a five-piece infrared single focus lens system in accordance with a third embodiment of the present invention, and FIG. 3B shows, in order from left to right, the image plane curve and the distortion curve of the third embodiment of the present invention. A five-piece infrared single focus lens system in accordance with the third embodiment of the present invention comprises a stop 300 and a lens group. The lens group comprises, in order from an object side to an image side: a first lens element 310, a second lens element 320, a third lens element 330, a fourth lens element 340, a fifth lens element 350, an IR band-pass element 370, and an image plane 380, wherein the five-piece infrared single focus lens system has a total of five lens elements with refractive power. The stop 300 is disposed between an object to be imaged and the first lens element 310.

The first lens element 310 with a positive refractive power has an object-side surface 311 being convex near an optical axis 390 and an image-side surface 312 being concave near the optical axis 390, the object-side surface 311 and the image-side surface 312 are aspheric, and the first lens element 310 is made of plastic material.

The second lens element 320 with a negative refractive power has an object-side surface 321 being concave near the optical axis 390 and an image-side surface 322 being convex near the optical axis 390, the object-side surface 321 and the image-side surface 322 are aspheric, and the second lens element 320 is made of plastic material.

The third lens element 330 with a positive refractive power has an object-side surface 331 being convex near the optical axis 390 and an image-side surface 332 being concave near the optical axis 390, the object-side surface 331 and the image-side surface 332 are aspheric, and the third lens element 330 is made of plastic material.

The fourth lens element 340 with a negative refractive power has an object-side surface 341 being concave near the optical axis 390 and an image-side surface 342 being convex near the optical axis 390, the object-side surface 341 and the image-side surface 342 are aspheric, and the fourth lens element 340 is made of plastic material.

The fifth lens element 350 with a positive refractive power has an object-side surface 351 being convex near the optical axis 390 and an image-side surface 352 being concave near the optical axis 390, the object-side surface 351 and the image-side surface 352 are aspheric and are provided with at least one inflection point, the fifth lens element 350 is made of plastic material.

The IR band-pass element 370 made of glass is located between the fifth lens element 350 and the image plane 380 and has no influence on the focal length of the five-piece infrared single focus lens system.

The detailed optical data of the third embodiment is shown in table 5, and the aspheric surface data is shown in table 6.

TABLE 5

Embodiment 3
f(focal lengl) = 3.46 mm, Fno = 1.30, FOV = 80.5 deg.

| surface | | Curvature Radius | | Thickness | Material | Index | Abbe # | Focal length |
|---|---|---|---|---|---|---|---|---|
| 0 | object | infinity | | 450.000 | | | | |
| 1 | test surface | infinity | | 0.222 | | | | |
| 2 | stop | infinity | | −0.222 | | | | |
| 3 | Lens 1 | 2.784 | (ASP) | 0.799 | plastic | 1.64 | 22.5 | 5.07 |
| 4 | | 21.358 | (ASP) | 0.570 | | | | |
| 5 | Lens 2 | −2.376 | (ASP) | 0.300 | plastic | 1.54 | 55.9 | −32.72 |
| 6 | | −2.870 | (ASP) | 0.040 | | | | |
| 7 | Lens 3 | 7.129 | (ASP) | 0.372 | plastic | 1.64 | 22.5 | 13.10 |
| 8 | | 56.671 | (ASP) | 0.374 | | | | |
| 9 | Lens 4 | −1.401 | (ASP) | 0.529 | plastic | 1.64 | 22.5 | −30.91 |
| 10 | | −1.730 | (ASP) | 0.040 | | | | |
| 11 | Lens 5 | 1.450 | (ASP) | 0.920 | plastic | 1.64 | 22.5 | 9.47 |
| 12 | | 1.456 | (ASP) | 0.826 | | | | |
| 13 | IR band-pass element | infinity | | 0.210 | glass | 1.52 | 64.2 | |
| 14 | | infinity | | 0.380 | | | | |
| 15 | Image plane | infinity | | infinity | | | | |

TABLE 6

Aspheric Coefficients

| surface | 3 | 4 |
|---|---|---|
| K: | −4.9819E−01 | 9.9500E+01 |
| A: | −5.5728E−03 | −2.9634E−02 |
| B: | −9.3415E−03 | −1.3652E−02 |
| C: | 5.0399E−04 | −2.0684E−04 |
| D: | 1.9118E−04 | −4.0579E−04 |
| E: | −8.4992E−04 | 1.2550E−04 |
| F: | −1.2700E−04 | 4.8807E−06 |
| G: | 0.0000E+00 | 0.0000E+00 |

| surface | 5 | 6 |
|---|---|---|
| K: | 9.1642E−01 | −2.8762E+00 |
| A: | −1.7195E−03 | 1.6216E−02 |
| B: | 2.2674E−03 | 5.7403E−04 |
| C: | 3.0792E−04 | −2.2138E−03 |
| D: | 1.5976E−03 | −8.0361E−04 |
| E: | 2.9614E−04 | 6.7746E−05 |
| F: | −8.2574E−05 | 3.0936E−05 |
| G: | 0.0000E+00 | 0.0000E+00 |

| surface | 7 | 8 |
|---|---|---|
| K: | −9.8398E+01 | −9.9288E+01 |
| A: | 6.2818E−03 | −2.1640E−02 |
| B: | −1.6314E−02 | −5.9414E−04 |
| C: | 1.4902E−03 | 1.1655E−03 |
| D: | 1.1215E−04 | 8.0252E−04 |
| E: | 1.4406E−04 | 1.8732E−05 |
| F: | 0.0000E+00 | 0.0000E+00 |
| G: | 0.0000E+00 | 0.0000E+00 |

| surface | 9 | 10 |
|---|---|---|
| K: | −8.8133E+00 | −1.3724E+00 |
| A: | 1.4330E−02 | 4.1431E−02 |
| B: | 9.7661E−03 | 3.9057E−03 |
| C: | −5.2661E−04 | −1.7968E−04 |
| D: | −3.5480E−04 | −3.0095E−04 |
| E: | −2.9864E−05 | 1.4313E−05 |
| F: | 0.0000E+00 | 0.0000E+00 |
| G: | 0.0000E+00 | 0.0000E+00 |

TABLE 6-continued

Aspheric Coefficients

| surface | 11 | 12 |
|---|---|---|
| K: | −5.7459E+00 | −4.3019E+00 |
| A: | −1.0040E−02 | −1.3387E−02 |
| B: | −1.7986E−03 | 6.6593E−04 |
| C: | −1.2572E−04 | −2.0436E−05 |
| D: | 1.2028E−04 | −1.7595E−05 |
| E: | −9.5631E−06 | 1.1778E−06 |
| F: | 0.0000E+00 | 0.0000E+00 |
| G: | 0.0000E+00 | 0.0000E+00 |

In the third embodiment, the equation of the aspheric surface profiles of the aforementioned lens elements is the same as the equation of the first embodiment. Also, the definitions of these parameters shown in the following table are the same as those stated in the first embodiment with corresponding values for the third embodiment, so an explanation in this regard will not be provided again.

Moreover, these parameters can be calculated from Table 5 and Table 6 as the following values and satisfy the following conditions:

Embodiment 3

| | | | |
|---|---|---|---|
| f[mm] | 3.46 | R7/R8 | 0.81 |
| Fno | 1.30 | R9/R10 | 1.00 |
| FOV[deg.] | 80.5 | f3/R5 | 1.84 |
| f1/f | 1.47 | TL/(CT2 + CT3 + CT4) | 4.46 |
| f3/f1 | 2.58 | TL/f | 1.55 |
| f12/f3 | 0.46 | BFL/TL | 0.26 |
| f12/f1234 | 1.07 | TL/IMH | 1.85 |
| f/f123 | 0.78 | f2 × CT2/(R3 × R4) | −1.44 |
| f1/R1 | 1.82 | (f1 × CT1 × R1)/ (f3 × CT3 × R5) | 0.32 |
| R4/R3 | 1.21 | | |

Figure 4A:
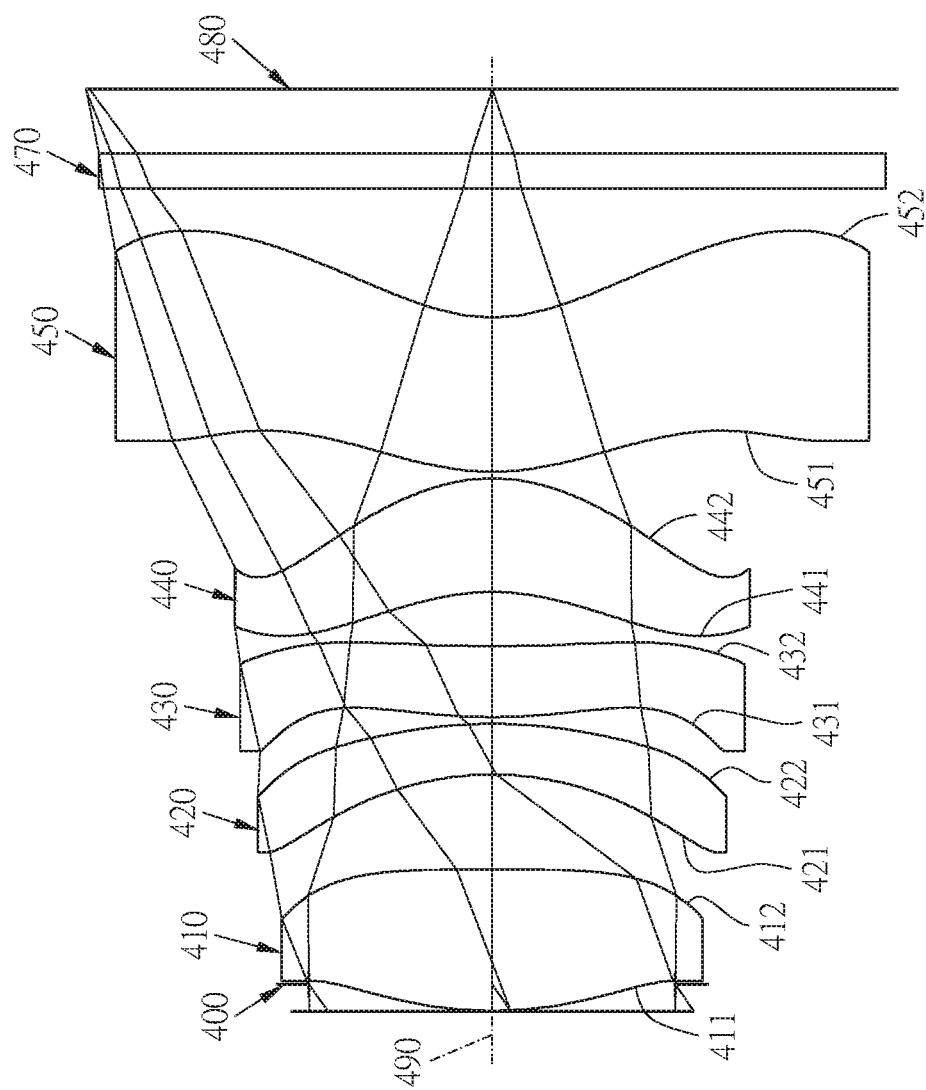
FIG. 4A shows a five-piece infrared single focus lens system in accordance with a fourth embodiment of the present invention.
Figure 4B:
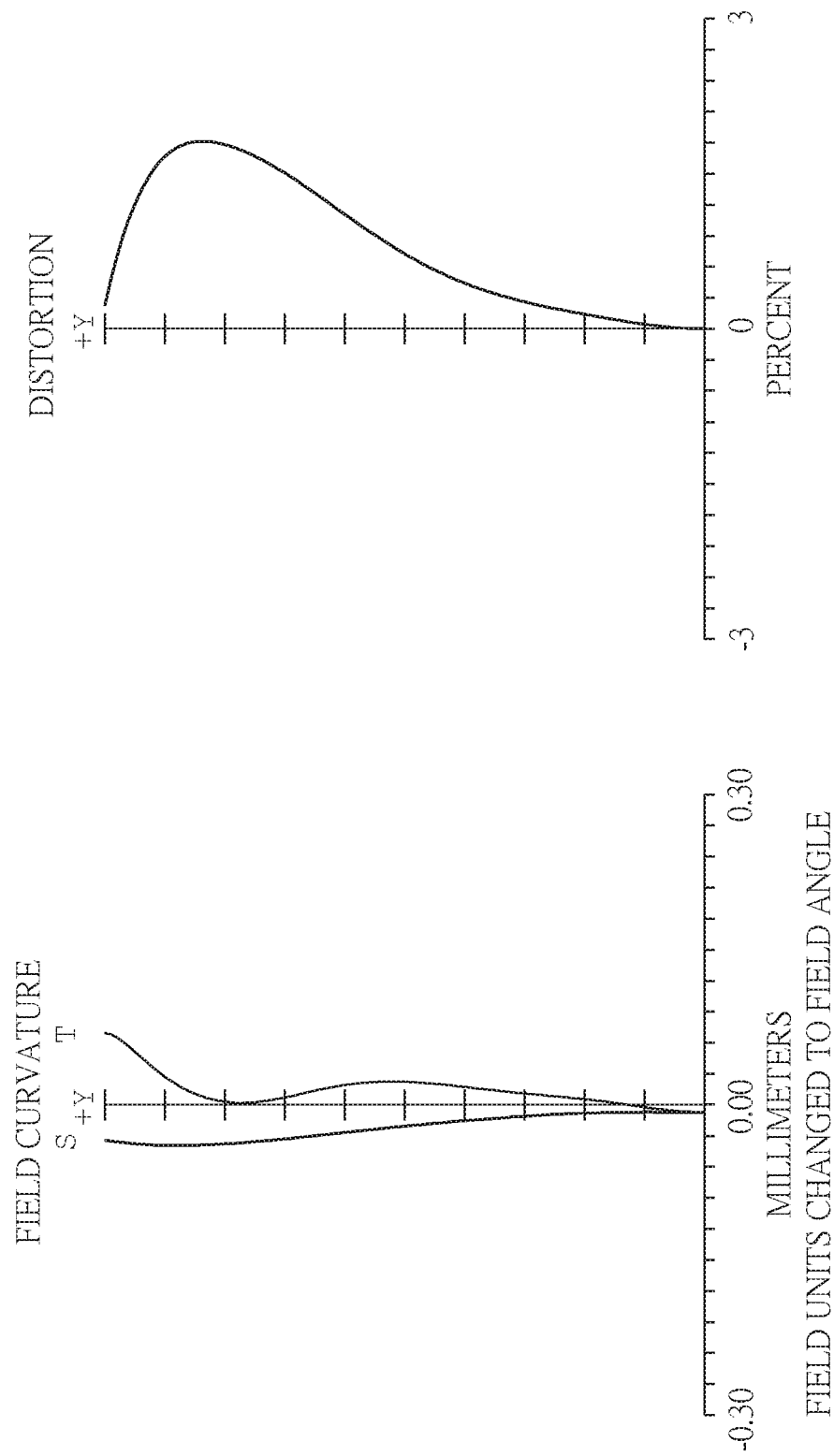
FIG. 4B shows the image plane curve and the distortion curve of the fourth embodiment of the present invention.

Referring to FIGS. 4A and 4B, FIG. 4A shows a five-piece infrared single focus lens system in accordance with a fourth embodiment of the present invention, and FIG. 4B shows, in order from left to right, the image plane curve and the distortion curve of the fourth embodiment of the present invention. A five-piece infrared single focus lens system in accordance with the fourth embodiment of the present invention comprises a stop 400 and a lens group. The lens group comprises, in order from an object side to an image side: a first lens element 410, a second lens element 420, a third lens element 430, a fourth lens element 440, a fifth lens element 450, an IR band-pass element 470, and an image plane 480, wherein the five-piece infrared single focus lens system has a total of five lens elements with refractive power. The stop 400 is disposed between an object to be imaged and the first lens element 410.

The first lens element 410 with a positive refractive power has an object-side surface 411 being convex near an optical axis 490 and an image-side surface 412 being convex near the optical axis 490, the object-side surface 411 and the image-side surface 412 are aspheric, and the first lens element 410 is made of plastic material.

The second lens element 420 with a negative refractive power has an object-side surface 421 being concave near the optical axis 490 and an image-side surface 422 being convex near the optical axis 490, the object-side surface 421 and the image-side surface 422 are aspheric, and the second lens element 420 is made of plastic material.

The third lens element 430 with a positive refractive power has an object-side surface 431 being convex near the optical axis 490 and an image-side surface 432 being concave near the optical axis 490, the object-side surface 431 and the image-side surface 432 are aspheric, and the third lens element 430 is made of plastic material.

The fourth lens element 440 with a positive refractive power has an object-side surface 441 being concave near the optical axis 490 and an image-side surface 442 being convex near the optical axis 490, the object-side surface 441 and the image-side surface 442 are aspheric, and the fourth lens element 440 is made of plastic material.

The fifth lens element 450 with a negative refractive power has an object-side surface 451 being convex near the optical axis 490 and an image-side surface 452 being concave near the optical axis 490, the object-side surface 451 and the image-side surface 452 are aspheric and are provided with at least one inflection point, the fifth lens element 450 is made of plastic material.

The IR band-pass element 470 made of glass is located between the fifth lens element 450 and the image plane 480 and has no influence on the focal length of the five-piece infrared single focus lens system.

The detailed optical data of the fourth embodiment is shown in table 7, and the aspheric surface data is shown in table 8.

TABLE 7

Embodiment 4 f(focal length) = 3.43 mm, Fno = 1.35, FOV = 78.3 deg.

| surface | | Curvature Radius | | Thickness | Material | Index | Abbe # | Focal length |
|---|---|---|---|---|---|---|---|---|
| 0 | object | infinity | | 450.000 | | | | |
| 1 | test surface | infinity | | 0.157 | | | | |
| 2 | stop | infinity | | −0.157 | | | | |
| 3 | Lens 1 | 3.117 | (ASP) | 0.838 | plastic | 1.64 | 22.5 | 4.73 |
| 4 | | −45.879 | (ASP) | 0.561 | | | | |
| 5 | Lens 2 | −2.454 | (ASP) | 0.300 | plastic | 1.54 | 55.9 | −12.63 |
| 6 | | −4.015 | (ASP) | 0.040 | | | | |
| 7 | Lens 3 | 4.435 | (ASP) | 0.420 | plastic | 1.64 | 22.5 | 11.04 |
| 8 | | 12.115 | (ASP) | 0.322 | | | | |
| 9 | Lens 4 | −1.817 | (ASP) | 0.672 | plastic | 1.64 | 22.5 | 7.32 |
| 10 | | −1.482 | (ASP) | 0.039 | | | | |
| 11 | Lens 5 | 2.025 | (ASP) | 0.915 | plastic | 1.64 | 22.5 | −15.96 |
| 12 | | 1.390 | (ASP) | 0.760 | | | | |
| 13 | IR band-pass element | infinity | | 0.210 | glass | 1.52 | 64.2 | |
| 14 | | infinity | | 0.380 | | | | |
| 15 | Image plane | infinity | | infinity | | | | |

TABLE 8

| Aspheric Coefficients | | |
|---|---|---|
| surface | 3 | 4 |
| K: | −1.6943E+00 | 9.9500E+01 |
| A: | −7.9611E−03 | −3.0847E−02 |
| B: | −4.1283E−03 | −1.6436E−02 |
| C: | −4.4561E−03 | 2.9046E−03 |
| D: | −1.2021E−04 | −6.5818E−05 |
| E: | 6.3483E−04 | −4.6250E−04 |
| F: | −5.8194E−04 | 8.0167E−05 |
| G: | 0.0000E+00 | 0.0000E+00 |
| surface | 5 | 6 |
| K: | 7.1355E−02 | 1.0150E+00 |
| A: | 1.3750E−02 | 7.9131E−03 |
| B: | −7.5916E−03 | 8.4408E−03 |
| C: | −8.3140E−04 | −3.1709E−03 |
| D: | 1.7040E−03 | −2.2619E−03 |
| E: | 2.2700E−04 | −1.6895E−04 |
| F: | −7.4670E−05 | 2.4731E−04 |
| G: | 0.0000E+00 | 0.0000E+00 |
| surface | 7 | 8 |
| K: | −3.3740E+01 | 4.2366E+01 |
| A: | −8.4790E−03 | −9.0984E−03 |
| B: | −2.1379E−02 | −1.0966E−02 |
| C: | −6.8148E−04 | −2.1572E−03 |
| D: | −3.9507E−04 | 1.4592E−03 |
| E: | 2.7212E−04 | 1.8657E−04 |
| F: | 5.2375E−05 | −1.0204E−04 |
| G: | 0.0000E+00 | 0.0000E+00 |
| surface | 9 | 10 |
| K: | −9.2558E+00 | −1.3437E+00 |
| A: | −1.3894E−02 | 2.7573E−02 |
| B: | 1.6102E−02 | −1.0383E−02 |
| C: | 3.5689E−04 | 3.4998E−03 |
| D: | −6.5746E−04 | 6.4315E−04 |
| E: | 1.1985E−05 | −6.4354E−05 |
| F: | 1.6574E−06 | −9.5528E−06 |
| G: | 1.5791E−06 | 1.7971E−06 |
| surface | 11 | 12 |
| K: | −6.9280E+00 | −4.7491E+00 |
| A: | −2.2251E−02 | −1.2610E−02 |
| B: | −1.2951E−03 | −1.3374E−03 |
| C: | −7.9240E−05 | 4.5259E−04 |
| D: | 1.7222E−04 | −4.0433E−05 |
| E: | −1.4028E−05 | −2.3160E−06 |
| F: | 3.2325E−07 | 4.1008E−07 |
| G: | −7.8021E−08 | −1.2301E−08 |

In the fourth embodiment, the equation of the aspheric surface profiles of the aforementioned lens elements is the same as the equation of the first embodiment. Also, the definitions of these parameters shown in the following table are the same as those stated in the first embodiment with corresponding values for the fourth embodiment, so an explanation in this regard will not be provided again.

Moreover, these parameters can be calculated from Table 7 and Table 8 as the following values and satisfy the following conditions:

| Embodiment 4 | | | |
|---|---|---|---|
| f[mm] | 3.43 | R7/R8 | 1.23 |
| Fno | 1.35 | R9/R10 | 1.46 |
| FOV[deg.] | 78.3 | f3/R5 | 2.49 |
| f1/f | 1.38 | TL/(CT2 + CT3 + CT4) | 3.92 |
| f3/f1 | 2.33 | TL/f | 1.59 |
| f12/f3 | 0.63 | BFL/TL | 0.25 |
| f12/f1234 | 1.83 | TL/IMH | 1.94 |
| f/f123 | 0.74 | f2 × CT2/(R3 × R4) | −0.38 |
| f1/R1 | 1.52 | (f1 × CT1 × R1)/ | 0.60 |
| R4/R3 | 1.64 | (f3 × CT3 × R5) | |

Figure 5A:
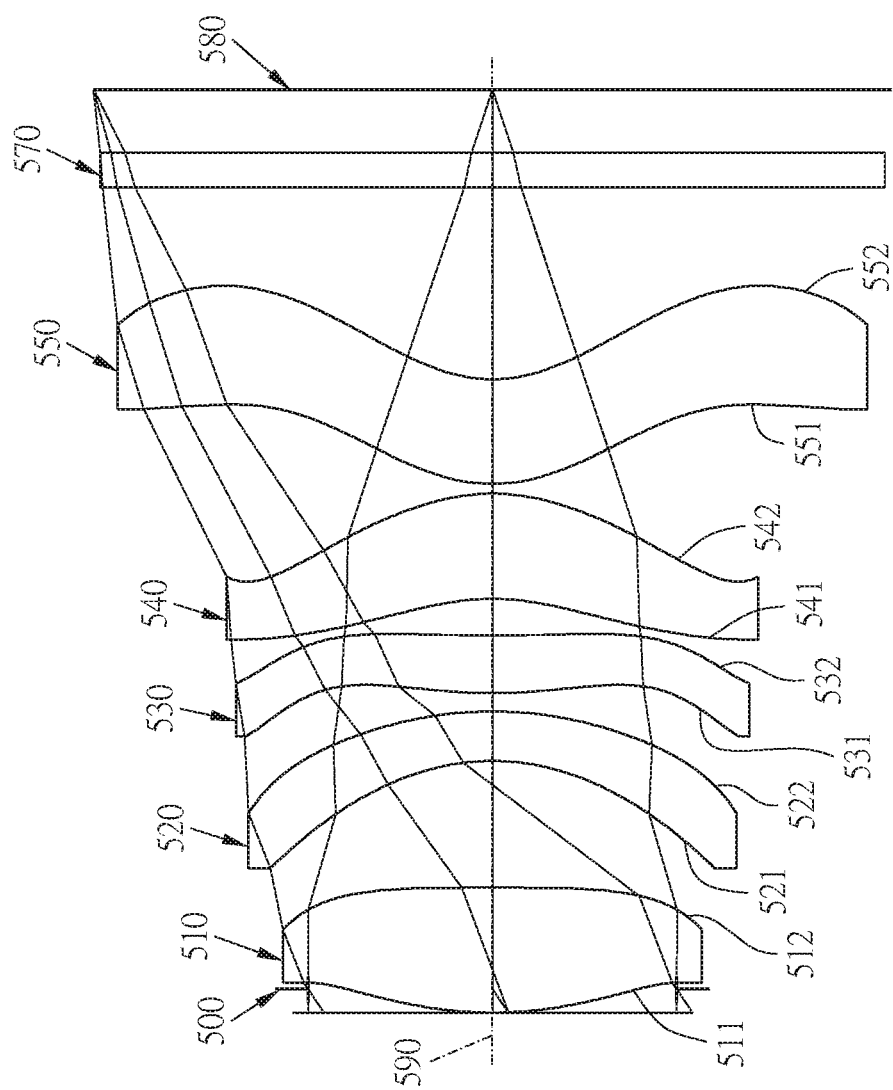
FIG. 5A shows a five-piece infrared single focus lens system in accordance with a fifth embodiment of the present invention.
Figure 5B:
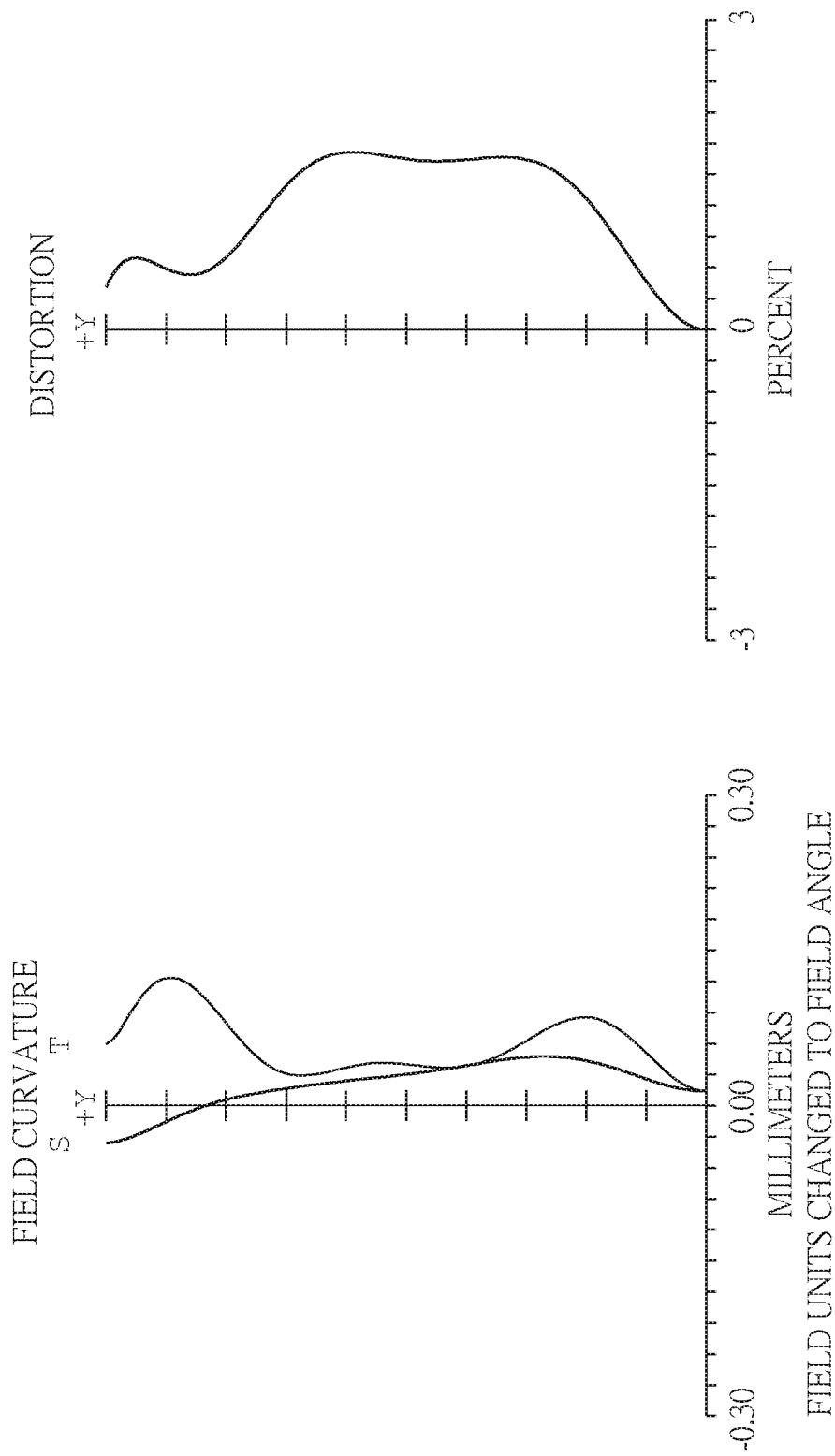
FIG. 5B shows the image plane curve and the distortion curve of the fifth embodiment of the present invention.

Referring to FIGS. 5A and 5B, FIG. 5A shows a five-piece infrared single focus lens system in accordance with a fifth embodiment of the present invention, and FIG. 5B shows, in order from left to right, the image plane curve and the distortion curve of the fifth embodiment of the present invention. A five-piece infrared single focus lens system in accordance with the fifth embodiment of the present invention comprises a stop 500 and a lens group. The lens group comprises, in order from an object side to an image side: a first lens element 510, a second lens element 520, a third lens element 530, a fourth lens element 540, a fifth lens element 550, an IR band-pass element 570, and an image plane 580, wherein the five-piece infrared single focus lens system has a total of five lens elements with refractive power. The stop 500 is disposed between an object to be imaged and the first lens element 510.

The first lens element 510 with a positive refractive power has an object-side surface 511 being convex near an optical axis 590 and an image-side surface 512 being convex near the optical axis 590, the object-side surface 511 and the image-side surface 512 are aspheric, and the first lens element 510 is made of plastic material.

The second lens element 520 with a negative refractive power has an object-side surface 521 being concave near the optical axis 590 and an image-side surface 522 being convex near the optical axis 590, the object-side surface 521 and the image-side surface 522 are aspheric, and the second lens element 520 is made of plastic material.

The third lens element 530 with a positive refractive power has an object-side surface 531 being convex near the optical axis 590 and an image-side surface 532 being concave near the optical axis 590, the object-side surface 531 and the image-side surface 532 are aspheric, and the third lens element 530 is made of plastic material.

The fourth lens element 540 with a positive refractive power has an object-side surface 541 being concave near the optical axis 590 and an image-side surface 542 being convex near the optical axis 590, the object-side surface 541 and the image-side surface 542 are aspheric, and the fourth lens element 540 is made of plastic material.

The fifth lens element 550 with a positive refractive power has an object-side surface 551 being convex near the optical axis 590 and an image-side surface 552 being concave near the optical axis 590, the object-side surface 551 and the image-side surface 552 are aspheric and are provided with at least one inflection point, the fifth lens element 550 is made of plastic material.

The IR band-pass element 570 made of glass is located between the fifth lens element 550 and the image plane 580 and has no influence on the focal length of the five-piece infrared single focus lens system.

The detailed optical data of the fifth embodiment is shown in table 9, and the aspheric surface data is shown in table 10.

TABLE 9

Embodiment 5
f(focal lengl) = 3.52 mm, Fno = 1.35, FOV = 77.1 deg.

| surface | | Curvature Radius | | Thickness | Material | Index | Abbe # | Focal length |
|---|---|---|---|---|---|---|---|---|
| 0 | object | infinity | | 700.000 | | | | |
| 1 | test surface | infinity | | 0.141 | | | | |
| 2 | stop | infinity | | −0.141 | | | | |
| 3 | Lens 1 | 3.332 | (ASP) | 0.755 | plastic | 1.64 | 22.5 | 5.02 |
| 4 | | −44.454 | (ASP) | 0.764 | | | | |
| 5 | Lens 2 | −1.874 | (ASP) | 0.299 | plastic | 1.64 | 22.5 | −8.17 |
| 6 | | −3.154 | (ASP) | 0.111 | | | | |
| 7 | Lens 3 | 4.378 | (ASP) | 0.347 | plastic | 1.64 | 22.5 | 9.92 |
| 8 | | 14.663 | (ASP) | 0.221 | | | | |
| 9 | Lens 4 | −1.873 | (ASP) | 0.635 | plastic | 1.64 | 22.5 | 9.84 |
| 10 | | −1.620 | (ASP) | 0.058 | | | | |
| 11 | Lens 5 | 1.342 | (ASP) | 0.631 | plastic | 1.64 | 22.5 | 33.88 |
| 12 | | 1.175 | (ASP) | 1.157 | | | | |
| 13 | IR band-pass element | infinity | | 0.210 | glass | 1.52 | 64.2 | |
| 14 | | infinity | | 0.380 | | | | |
| 15 | Image plane | infinity | | infinity | | | | |

TABLE 10

Aspheric Coefficients

| surface | 3 | 4 |
|---|---|---|
| K: | 4.8563E−01 | −9.9500E+01 |
| A: | −5.0824E−03 | −2.2553E−02 |
| B: | −2.0044E−02 | −9.1454E−03 |
| C: | 1.0161E−02 | −1.9114E−04 |
| D: | −4.3427E−03 | −3.9227E−04 |
| E: | −3.3925E−05 | −5.5139E−06 |
| F: | 0.0000E+00 | 0.0000E+00 |
| G: | 0.0000E+00 | 0.0000E+00 |

| surface | 5 | 6 |
|---|---|---|
| K: | 1.2251E−01 | −6.3806E−01 |
| A: | 3.4873E−02 | 7.0703E−04 |
| B: | −7.7738E−03 | 2.6963E−03 |
| C: | 3.1062E−03 | −2.1330E−03 |
| D: | 4.7544E−04 | −2.0732E−04 |
| E: | −1.9543E−05 | 1.1152E−05 |
| F: | 0.0000E+00 | 0.0000E+00 |
| G: | 0.0000E+00 | 0.0000E+00 |

| surface | 7 | 8 |
|---|---|---|
| K: | −2.1036E+01 | −9.9935E+01 |
| A: | −2.9570E−02 | −2.1823E−02 |
| B: | −2.2385E−02 | −1.0621E−02 |
| C: | 2.1595E−03 | −6.2095E−04 |
| D: | 8.6740E−04 | 7.8982E−04 |
| E: | 3.8555E−06 | 5.4237E−06 |
| F: | 0.0000E+00 | 0.0000E+00 |
| G: | 0.0000E+00 | 0.0000E+00 |

| surface | 9 | 10 |
|---|---|---|
| K: | −1.0458E+01 | −6.1862E+00 |
| A: | 2.9748E−02 | −3.9719E−02 |
| B: | −6.7978E−03 | 1.3772E−02 |
| C: | 9.9393E−04 | −1.3767E−03 |
| D: | −1.9653E−05 | 2.6580E−04 |
| E: | −9.2188E−06 | 1.3807E−05 |
| F: | 0.0000E+00 | 0.0000E+00 |
| G: | 0.0000E+00 | 0.0000E+00 |

TABLE 10-continued

Aspheric Coefficients

| surface | 11 | 12 |
|---|---|---|
| K: | −7.8767E−01 | −2.3525E+00 |
| A: | −9.6976E−02 | −3.5658E−02 |
| B: | −4.5932E−04 | −1.4782E−03 |
| C: | 2.2408E−03 | 1.0077E−03 |
| D: | −2.6009E−04 | −9.7163E−05 |
| E: | 5.5206E−06 | 1.9448E−06 |
| F: | 0.0000E+00 | 0.0000E+00 |
| G: | 0.0000E+00 | 0.0000E+00 |

In the fifth embodiment, the equation of the aspheric surface profiles of the aforementioned lens elements is the same as the equation of the first embodiment. Also, the definitions of these parameters shown in the following table are the same as those stated in the first embodiment with corresponding values for the fifth embodiment, so an explanation in this regard will not be provided again.

Moreover, these parameters can be calculated from Table 9 and Table 10 as the following values and satisfy the following conditions:

| Embodiment 5 | | | |
|---|---|---|---|
| f[mm] | 3.52 | R7/R8 | 1.16 |
| Fno | 1.35 | R9/R10 | 1.14 |
| FOV[deg.] | 77.1 | f3/R5 | 2.27 |
| f1/f | 1.42 | TL/(CT2 + CT3 + CT4) | 4.35 |
| f3/f1 | 1.98 | TL/f | 1.58 |
| f12/f3 | 1.02 | BFL/TL | 0.31 |
| f12/f1234 | 2.21 | TL/IMH | 1.97 |
| f/f123 | 0.62 | f2 × CT2/(R3 × R4) | −0.41 |
| f1/R1 | 1.51 | (f1 × CT1 × R1)/ (f3 × CT3 × R5) | 0.84 |
| R4/R3 | 1.68 | | |

Figure 6A:
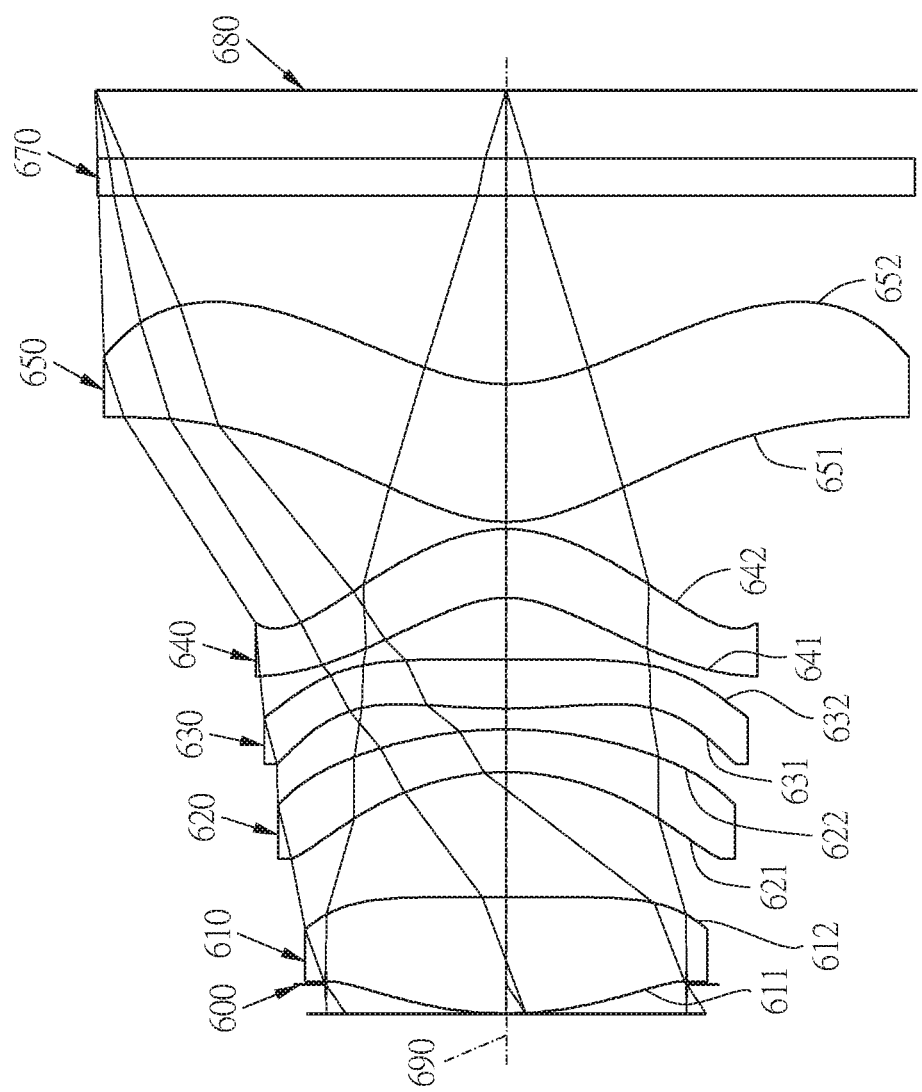
FIG. 6A shows a five-piece infrared single focus lens system in accordance with a sixth embodiment of the present invention.
Figure 6B:
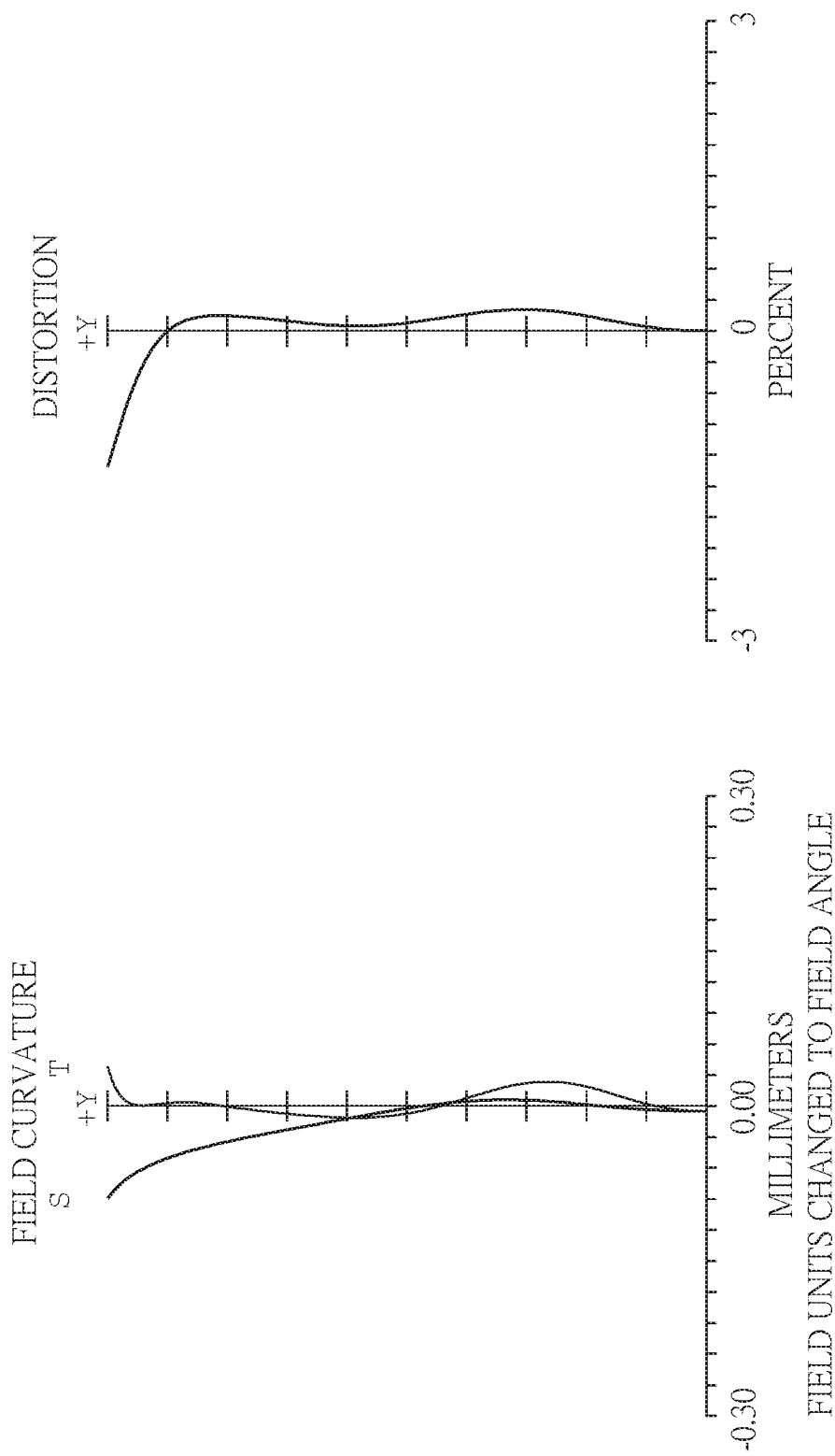
FIG. 6B shows the image plane curve and the distortion curve of the sixth embodiment of the present invention.

Referring to FIGS. 6A and 6B, FIG. 6A shows a five-piece infrared single focus lens system in accordance with a sixth embodiment of the present invention, and FIG. 6B shows, in order from left to right, the image plane curve and the distortion curve of the sixth embodiment of the present invention. A five-piece infrared single focus lens system in accordance with the sixth embodiment of the present invention comprises a stop 600 and a lens group. The lens group comprises, in order from an object side to an image side: a first lens element 610, a second lens element 620, a third lens element 630, a fourth lens element 640, a fifth lens element 650, an IR band-pass element 670, and an image plane 680, wherein the five-piece infrared single focus lens system has a total of five lens elements with refractive power. The stop 600 is disposed between an object to be imaged and the first lens element 610.

The first lens element 610 with a positive refractive power has an object-side surface 611 being convex near an optical axis 690 and an image-side surface 612 being concave near the optical axis 690, the object-side surface 611 and the image-side surface 612 are aspheric, and the first lens element 610 is made of plastic material.

The second lens element 620 with a negative refractive power has an object-side surface 621 being concave near the optical axis 690 and an image-side surface 622 being convex near the optical axis 690, the object-side surface 621 and the image-side surface 622 are aspheric, and the second lens element 620 is made of plastic material.

The third lens element 630 with a positive refractive power has an object-side surface 631 being convex near the optical axis 690 and an image-side surface 632 being concave near the optical axis 690, the object-side surface 631 and the image-side surface 632 are aspheric, and the third lens element 630 is made of plastic material.

The fourth lens element 640 with a negative refractive power has an object-side surface 641 being concave near the optical axis 690 and an image-side surface 642 being convex near the optical axis 690, the object-side surface 641 and the image-side surface 642 are aspheric, and the fourth lens element 640 is made of plastic material.

The fifth lens element 650 with a positive refractive power has an object-side surface 651 being convex near the optical axis 690 and an image-side surface 652 being concave near the optical axis 690, the object-side surface 651 and the image-side surface 652 are aspheric and are provided with at least one inflection point, the fifth lens element 650 is made of plastic material.

The IR band-pass element 670 made of glass is located between the fifth lens element 650 and the image plane 680 and has no influence on the focal length of the five-piece infrared single focus lens system.

The detailed optical data of the sixth embodiment is shown in table 11, and the aspheric surface data is shown in table 12.

TABLE 11

Embodiment 6 f(focal length) = 3.43 mm, Fno = 1.45, FOV = 76.9 deg.

| surface | | Curvature Radius | | Thickness | Material | Index | Abbe # | Focal length |
|---|---|---|---|---|---|---|---|---|
| 0 | object | infinity | | 700.000 | | | | |
| 1 | test surface | infinity | | 0.163 | | | | |
| 2 | stop | infinity | | −0.163 | | | | |
| 3 | Lens 1 | 2.821 | (ASP) | 0.654 | plastic | 1.64 | 22.5 | 4.70 |
| 4 | | 78.319 | (ASP) | 0.700 | | | | |
| 5 | Lens 2 | −1.923 | (ASP) | 0.240 | plastic | 1.54 | 55.9 | −9.48 |
| 6 | | −3.232 | (ASP) | 0.116 | | | | |
| 7 | Lens 3 | 4.761 | (ASP) | 0.274 | plastic | 1.64 | 22.5 | 8.23 |
| 8 | | 67.905 | (ASP) | 0.347 | | | | |
| 9 | Lens 4 | −0.799 | (ASP) | 0.385 | plastic | 1.64 | 22.5 | −8.11 |
| 10 | | −1.125 | (ASP) | 0.040 | | | | |
| 11 | Lens 5 | 1.089 | (ASP) | 0.773 | plastic | 1.64 | 22.5 | 4.48 |
| 12 | | 1.303 | (ASP) | 1.056 | | | | |
| 13 | IR band-pass element | infinity | | 0.210 | glass | 1.52 | 64.2 | |
| 14 | | infinity | | 0.380 | | | | |
| 15 | Image plane | infinity | | infinity | | | | |

TABLE 12

| Aspheric Coefficients | | |
|---|---|---|
| surface | 3 | 4 |
| K: | 1.8594E-01 | -9.9500E+01 |
| A: | -1.7345E-02 | -2.6903E-02 |
| B: | -9.0361E-04 | -2.2878E-02 |
| C: | -1.6793E-02 | 7.5198E-03 |
| D: | 1.0505E-02 | -5.5246E-03 |
| E: | -4.7883E-03 | 9.5642E-04 |
| F: | 0.0000E+00 | 0.0000E+00 |
| G: | 0.0000E+00 | 0.0000E+00 |
| surface | 5 | 6 |
| K: | 4.2211E-01 | -1.8761E+00 |
| A: | 4.6843E-02 | -1.3879E-02 |
| B: | -3.0725E-02 | 2.0949E-02 |
| C: | 9.9053E-03 | -1.0983E-02 |
| D: | 4.7055E-03 | -1.5927E-03 |
| E: | -6.0012E-04 | 8.8839E-04 |
| F: | 0.0000E+00 | 0.0000E+00 |
| G: | 0.0000E+00 | 0.0000E+00 |
| surface | 7 | 8 |
| K: | -7.3237E+01 | 9.9500E+01 |
| A: | -4.7260E-02 | -2.8582E-02 |
| B: | -3.4344E-02 | -2.5233E-02 |
| C: | 4.1290E-03 | 1.7580E-03 |
| D: | 8.5600E-04 | 2.5176E-03 |
| E: | 3.4290E-04 | -3.4084E-04 |
| F: | 0.0000E+00 | 0.0000E+00 |
| G: | 0.0000E+00 | 0.0000E+00 |
| surface | 9 | 10 |
| K: | -5.0477E+00 | -3.2530E+00 |
| A: | 2.0090E-02 | -2.5346E-02 |
| B: | 7.8976E-03 | 7.3451E-03 |
| C: | -1.9096E-03 | 4.7233E-03 |
| D: | 6.9426E-05 | -4.1764E-04 |
| E: | -2.1829E-05 | 6.6486E-05 |
| F: | 0.0000E+00 | 0.0000E+00 |
| G: | 0.0000E+00 | 0.0000E+00 |
| surface | 11 | 12 |
| K: | -5.1057E+00 | -5.3574E+00 |
| A: | -4.3650E-03 | -8.7176E-03 |
| B: | -7.2283E-03 | -4.1711E-03 |
| C: | 1.9084E-03 | 9.6479E-04 |
| D: | -1.4044E-04 | -7.7010E-05 |
| E: | -7.2119E-06 | -3.8642E-06 |
| F: | 1.0288E-06 | 5.2722E-07 |
| G: | 0.0000E+00 | 0.0000E+00 |

In the sixth embodiment, the equation of the aspheric surface profiles of the aforementioned lens elements is the same as the equation of the first embodiment. Also, the definitions of these parameters shown in the following table are the same as those stated in the first embodiment with corresponding values for the sixth embodiment, so an explanation in this regard will not be provided again.

Moreover, these parameters can be calculated from Table 11 and Table 12 as the following values and satisfy the following conditions:

| Embodiment 6 | | | |
|---|---|---|---|
| f[mm] | 3.43 | R7/R8 | 0.71 |
| Fno | 1.45 | R9/R10 | 0.84 |
| FOV[deg.] | 76.9 | f3/R5 | 1.73 |
| f1/f | 1.37 | TL/(CT2 + CT3 + CT4) | 5.76 |
| f3/f1 | 1.75 | TL/f | 1.51 |

-continued

| Embodiment 6 | | | |
|---|---|---|---|
| f12/f3 | 0.96 | BFL/TL | 0.32 |
| f12/f1234 | 0.88 | TL/IMH | 1.92 |
| f/f123 | 0.75 | f2 × CT2/(R3 × R4) | -0.37 |
| f1/R1 | 1.66 | (f1 × CT1 × R1)/ | 0.81 |
| R4/R3 | 1.68 | (f3 × CT3 × R5) | |

Figure 7A:
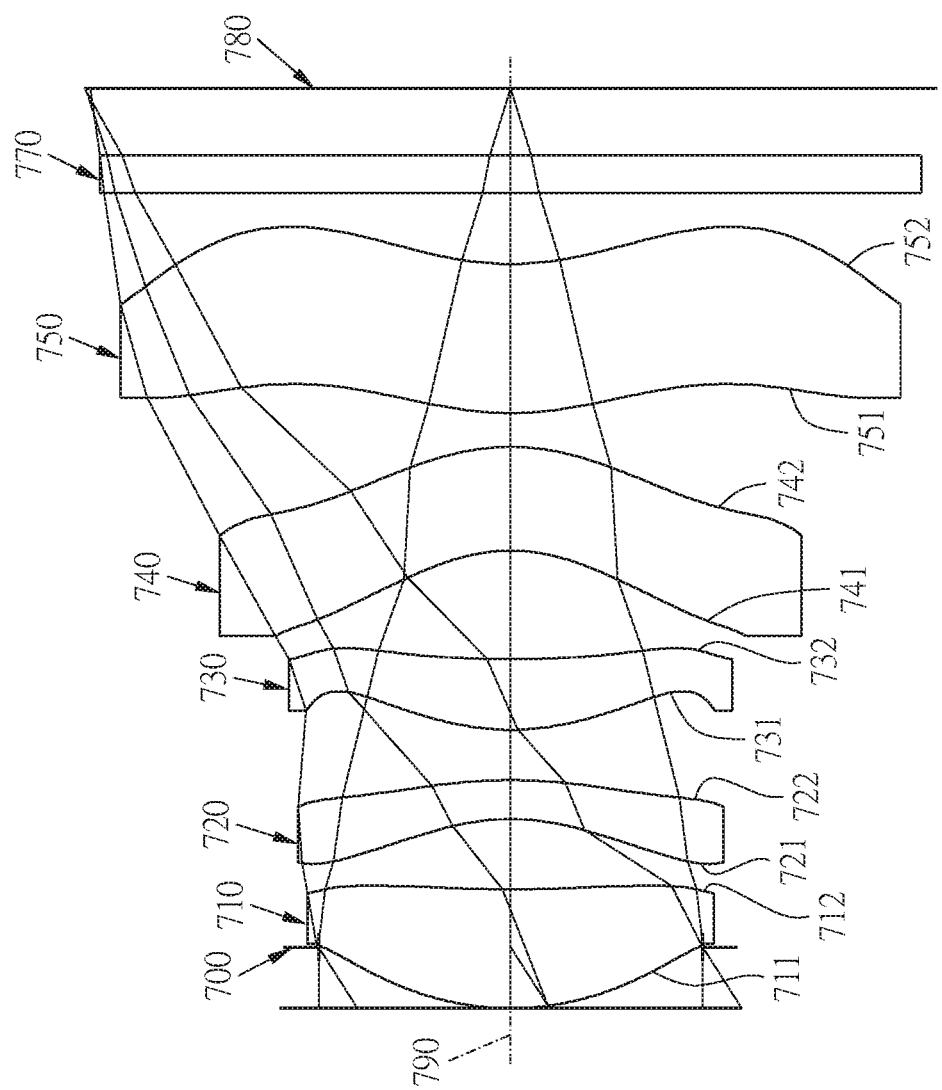
FIG. 7A shows a five-piece infrared single focus lens system in accordance with a seventh embodiment of the present invention.
Figure 7B:
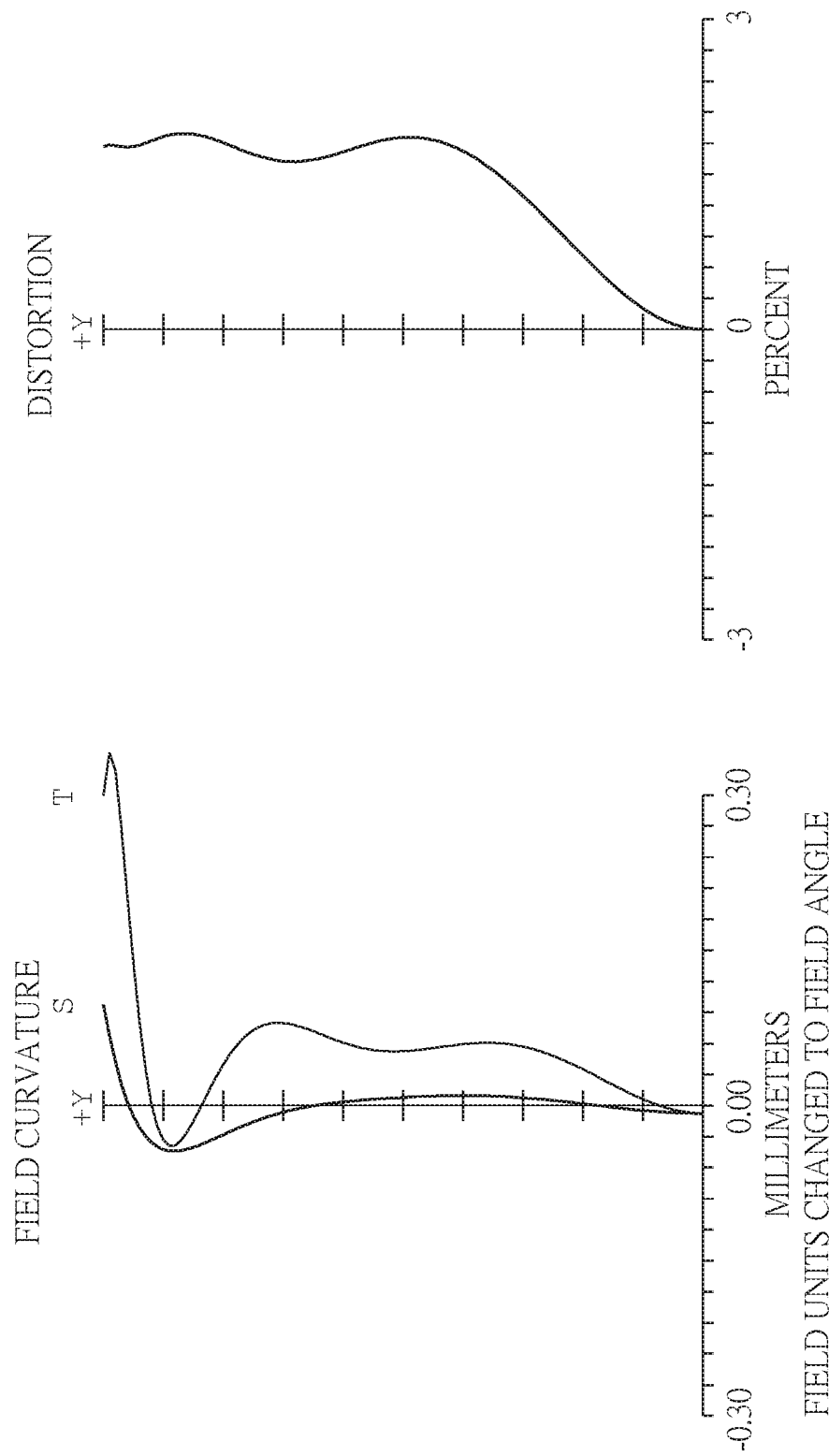
FIG. 7B shows the image plane curve and the distortion curve of the seventh embodiment of the present invention.

Referring to FIGS. 7A and 7B, FIG. 7A shows a five-piece infrared single focus lens system in accordance with a seventh embodiment of the present invention, and FIG. 7B shows, in order from left to right, the image plane curve and the distortion curve of the seventh embodiment of the present invention. A five-piece infrared single focus lens system in accordance with the seventh embodiment of the present invention comprises a stop 700 and a lens group. The lens group comprises, in order from an object side to an image side: a first lens element 710, a second lens element 720, a third lens element 730, a fourth lens element 740, a fifth lens element 750, an IR band-pass element 770, and an image plane 780, wherein the five-piece infrared single focus lens system has a total of five lens elements with refractive power. The stop 700 is disposed between an object to be imaged and the first lens element 710.

The first lens element 710 with a positive refractive power has an object-side surface 711 being convex near an optical axis 790 and an image-side surface 712 being concave near the optical axis 790, the object-side surface 711 and the image-side surface 712 are aspheric, and the first lens element 710 is made of plastic material.

The second lens element 720 with a negative refractive power has an object-side surface 721 being concave near the optical axis 790 and an image-side surface 722 being convex near the optical axis 790, the object-side surface 721 and the image-side surface 722 are aspheric, and the second lens element 720 is made of plastic material.

The third lens element 730 with a positive refractive power has an object-side surface 731 being convex near the optical axis 790 and an image-side surface 732 being concave near the optical axis 790, the object-side surface 731 and the image-side surface 732 are aspheric, and the third lens element 730 is made of plastic material.

The fourth lens element 740 with a negative refractive power has an object-side surface 741 being concave near the optical axis 790 and an image-side surface 742 being convex near the optical axis 790, the object-side surface 741 and the image-side surface 742 are aspheric, and the fourth lens element 740 is made of plastic material.

The fifth lens element 750 with a positive refractive power has an object-side surface 751 being convex near the optical axis 790 and an image-side surface 752 being concave near the optical axis 790, the object-side surface 751 and the image-side surface 752 are aspheric and are provided with at least one inflection point, the fifth lens element 750 is made of plastic material.

The IR band-pass element 770 made of glass is located between the fifth lens element 750 and the image plane 780 and has no influence on the focal length of the five-piece infrared single focus lens system.

The detailed optical data of the seventh embodiment is shown in table 13, and the aspheric surface data is shown in table 14.

TABLE 13

Embodiment 7
f(focal length) = 3.67 mm, Fno = 1.45, FOV = 73.3 deg.

| surface | | Curvature Radius | | Thickness | Material | Index | Abbe # | Focal length |
|---|---|---|---|---|---|---|---|---|
| 0 | object | infinity | | 700.000 | | | | |
| 1 | test surface | infinity | | 0.343 | | | | |
| 2 | stop | infinity | | −0.343 | | | | |
| 3 | Lens 1 | 2.158 | (ASP) | 0.670 | plastic | 1.64 | 22.5 | 4.14 |
| 4 | | 11.895 | (ASP) | 0.394 | | | | |
| 5 | Lens 2 | −1.701 | (ASP) | 0.219 | plastic | 1.54 | 55.9 | −5.84 |
| 6 | | −3.898 | (ASP) | 0.284 | | | | |
| 7 | Lens 3 | 1.945 | (ASP) | 0.397 | plastic | 1.64 | 22.5 | 3.83 |
| 8 | | 9.905 | (ASP) | 0.610 | | | | |
| 9 | Lens 4 | −1.298 | (ASP) | 0.582 | plastic | 1.64 | 22.5 | −18.39 |
| 10 | | −1.716 | (ASP) | 0.191 | | | | |
| 11 | Lens 5 | 2.474 | (ASP) | 0.838 | plastic | 1.64 | 22.5 | 207.19 |
| 12 | | 2.195 | (ASP) | 0.399 | | | | |
| 13 | IR band-pass element | infinity | | 0.210 | glass | 1.52 | 64.2 | |
| 14 | | infinity | | 0.380 | | | | |
| 15 | Image plane | infinity | | infinity | | | | |

TABLE 14

Aspheric Coefficients

| surface | 3 | 4 |
|---|---|---|
| K: | 7.6372E−01 | 7.4044E+01 |
| A: | −8.2021E−03 | −2.4586E−02 |
| B: | −1.9838E−02 | 2.5320E−03 |
| C: | 1.2416E−02 | −1.1379E−02 |
| D: | −7.2100E−03 | 3.0052E−03 |
| E: | 5.7466E−05 | −5.1225E−04 |
| F: | −1.1621E−04 | −7.8923E−05 |
| G: | 0.0000E+00 | 0.0000E+00 |

| surface | 5 | 6 |
|---|---|---|
| K: | −1.3811E+00 | 1.1920E+00 |
| A: | 1.0771E−01 | 3.5629E−02 |
| B: | −2.5658E−02 | 1.8238E−02 |
| C: | −1.1112E−03 | −5.8083E−03 |
| D: | 2.1682E−03 | −2.7599E−03 |
| E: | 4.1540E−04 | 3.7165E−04 |
| F: | 1.0256E−04 | −6.6997E−05 |
| G: | 0.0000E+00 | 0.0000E+00 |

| surface | 7 | 8 |
|---|---|---|
| K: | −1.0271E+01 | −8.3683E+01 |
| A: | 5.6047E−02 | 2.4302E−02 |
| B: | −2.1611E−02 | 2.4837E−02 |
| C: | −1.5720E−02 | −3.3002E−02 |
| D: | 4.5919E−04 | −6.2943E−03 |
| E: | −7.7680E−04 | 6.2883E−03 |
| F: | −6.3274E−04 | −3.1479E−04 |
| G: | 0.0000E+00 | 0.0000E+00 |

| surface | 9 | 10 |
|---|---|---|
| K: | −3.6558E+00 | −3.8045E+00 |
| A: | −2.3073E−02 | −2.0198E−03 |
| B: | 8.1964E−02 | 1.4581E−02 |
| C: | −7.6426E−02 | 9.8520E−04 |
| D: | 3.4673E−02 | −1.5153E−03 |
| E: | −5.5717E−03 | 8.6668E−05 |
| F: | −1.3556E−04 | 1.2359E−05 |
| G: | 0.0000E+00 | 0.0000E+00 |

TABLE 14-continued

Aspheric Coefficients

| surface | 11 | 12 |
|---|---|---|
| K: | −5.5492E−01 | −4.5886E−01 |
| A: | −8.5194E−02 | −8.3688E−02 |
| B: | 1.1718E−02 | 9.3486E−03 |
| C: | −4.8457E−04 | −1.1226E−03 |
| D: | −4.5173E−05 | 8.9874E−05 |
| E: | 5.1720E−06 | −2.8806E−06 |
| F: | −8.1361E−08 | −4.3819E−08 |
| G: | 0.0000E+00 | 0.0000E+00 |

In the seventh embodiment, the equation of the aspheric surface profiles of the aforementioned lens elements is the same as the equation of the first embodiment. Also, the definitions of these parameters shown in the following table are the same as those stated in the first embodiment with corresponding values for the seventh embodiment, so an explanation in this regard will not be provided again.

Moreover, these parameters can be calculated from Table 13 and Table 14 as the following values and satisfy the following conditions:

| Embodiment 7 | | | |
|---|---|---|---|
| f[mm] | 3.67 | R7/R8 | 0.76 |
| Fno | 1.45 | R9/R10 | 1.13 |
| FOV[deg.] | 73.3 | f3/R5 | 1.97 |
| f1/f | 1.13 | TL/(CT2 + CT3 + CT4) | 4.32 |
| f3/f1 | 0.92 | TL/f | 1.41 |
| f12/f3 | 2.55 | BFL/TL | 0.19 |
| f12/f1234 | 2.31 | TL/IMH | 1.85 |
| f/f123 | 1.11 | f2 × CT2/(R3 × R4) | −0.19 |
| f1/R1 | 1.92 | (f1 × CT1 × R1)/ (f3 × CT3 × R5) | 2.02 |
| R4/R3 | 2.29 | | |

Figure 8A:
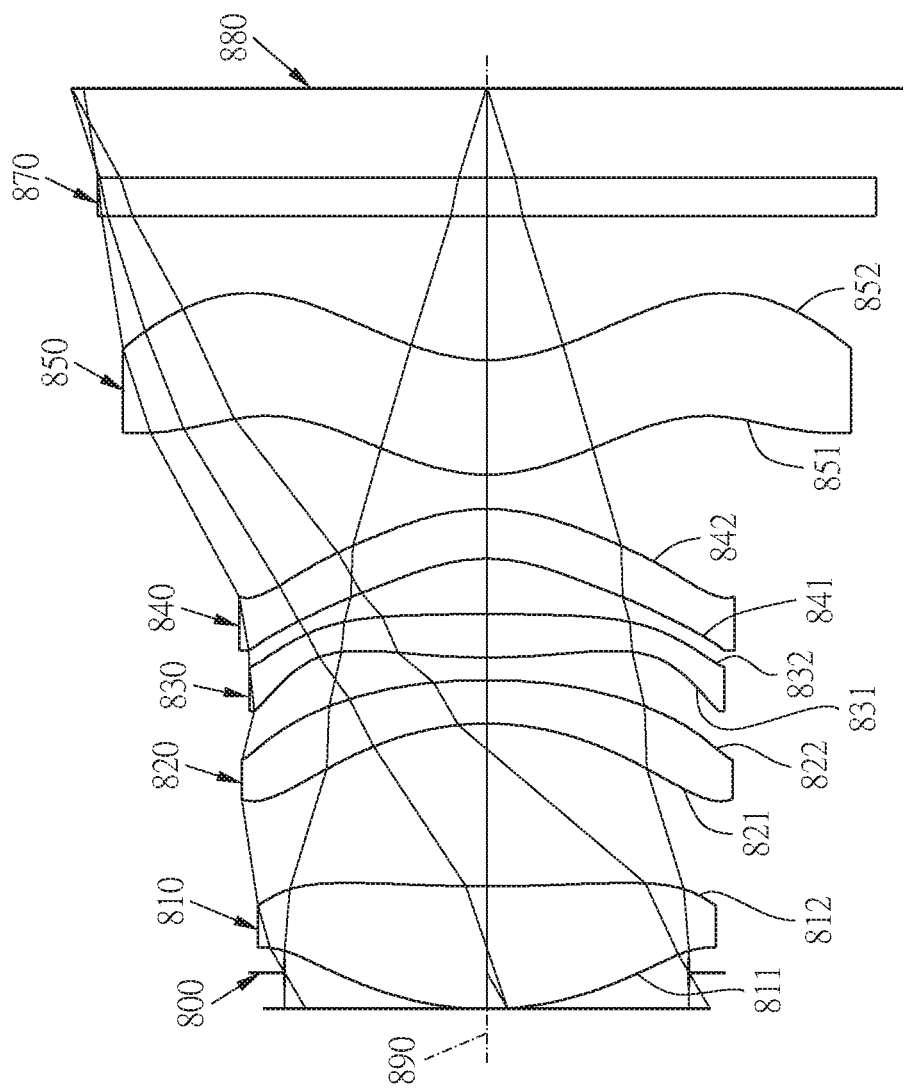
FIG. 8A shows a five-piece infrared single focus lens system in accordance with an eighth embodiment of the present invention.
Figure 8B:
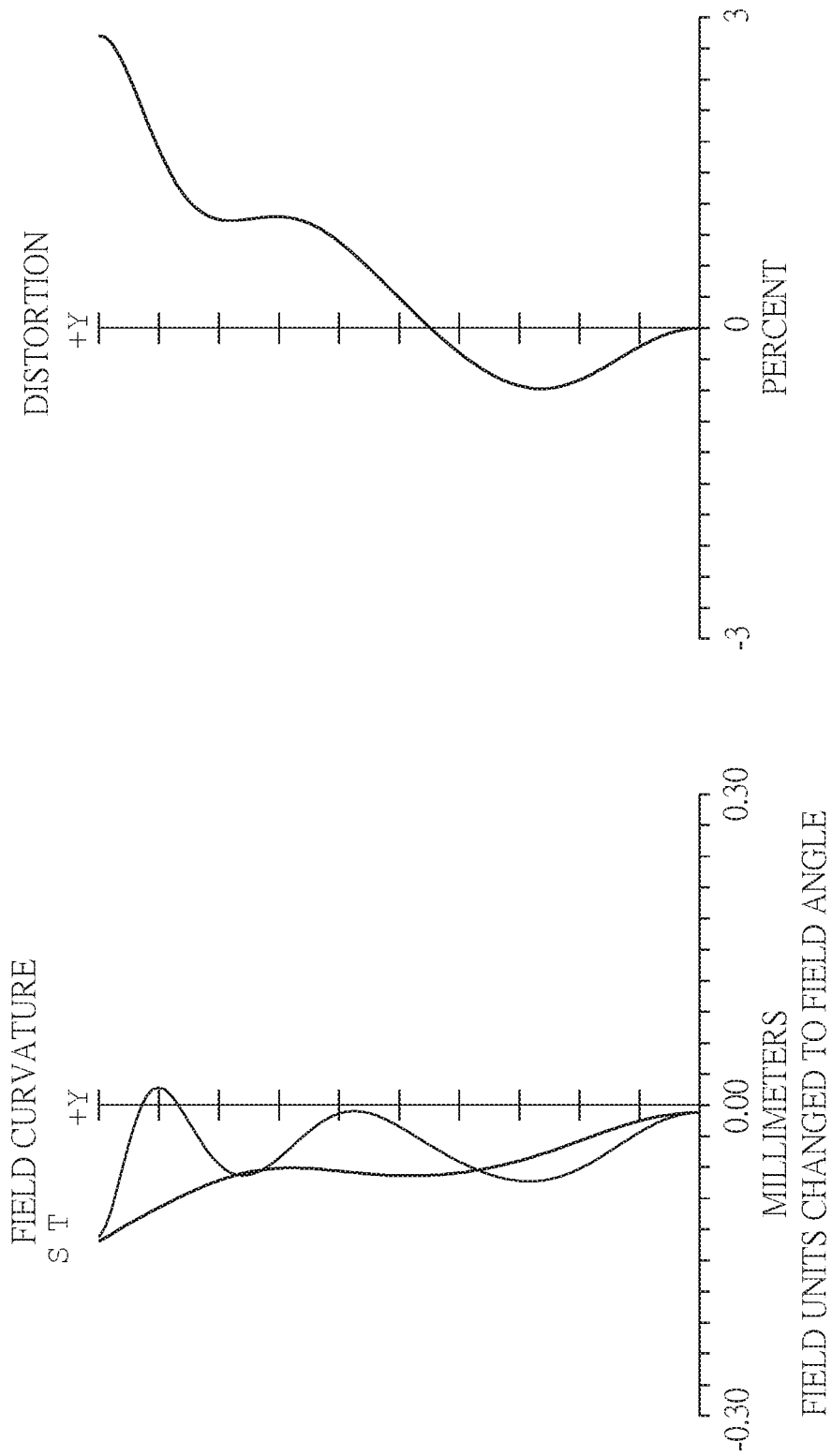
FIG. 8B shows the image plane curve and the distortion curve of the eighth embodiment of the present invention.

Referring to FIGS. 8A and 8B, FIG. 8A shows a five-piece infrared single focus lens system in accordance with an eighth embodiment of the present invention, and FIG. 8B shows, in order from left to right, the image plane curve and the distortion curve of the eighth embodiment of the present invention. A five-piece infrared single focus lens system in accordance with the eighth embodiment of the present invention comprises a stop 800 and a lens group. The lens group comprises, in order from an object side to an image side: a first lens element 810, a second lens element 820, a third lens element 830, a fourth lens element 840, a fifth lens element 850, an IR band-pass element 870, and an image plane 880, wherein the five-piece infrared single focus lens system has a total of five lens elements with refractive power. The stop 800 is disposed between an object to be imaged and the first lens element 810.

The first lens element 810 with a positive refractive power has an object-side surface 811 being convex near an optical axis 890 and an image-side surface 812 being concave near the optical axis 890, the object-side surface 811 and the image-side surface 812 are aspheric, and the first lens element 810 is made of plastic material.

The second lens element 820 with a negative refractive power has an object-side surface 821 being concave near the optical axis 890 and an image-side surface 822 being convex near the optical axis 890, the object-side surface 821 and the image-side surface 822 are aspheric, and the second lens element 820 is made of plastic material.

The third lens element 830 with a positive refractive power has an object-side surface 831 being convex near the optical axis 890 and an image-side surface 832 being convex near the optical axis 890, the object-side surface 831 and the image-side surface 832 are aspheric, and the third lens element 830 is made of plastic material.

The fourth lens element 840 with a negative refractive power has an object-side surface 841 being concave near the optical axis 890 and an image-side surface 842 being convex near the optical axis 890, the object-side surface 841 and the image-side surface 842 are aspheric, and the fourth lens element 840 is made of plastic material.

The fifth lens element 850 with a positive refractive power has an object-side surface 851 being convex near the optical axis 890 and an image-side surface 852 being concave near the optical axis 890, the object-side surface 851 and the image-side surface 852 are aspheric and are provided with at least one inflection point, the fifth lens element 850 is made of plastic material.

The IR band-pass element 870 made of glass is located between the fifth lens element 850 and the image plane 880 and has no influence on the focal length of the five-piece infrared single focus lens system.

The detailed optical data of the eighth embodiment is shown in table 15, and the aspheric surface data is shown in table 16.

TABLE 15

Embodiment 8
f(focal length) = 3.80 mm, Fno = 1.45, FOV = 68.9 deg.

| surface | | Curvature Radius | | Thickness | Material | Index | Abbe # | Focal length |
|---|---|---|---|---|---|---|---|---|
| 0 | object | infinity | | 700.000 | | | | |
| 1 | test surface | infinity | | 0.201 | | | | |
| 2 | stop | infinity | | −0.201 | | | | |
| 3 | Lens 1 | 2.372 | (ASP) | 0.681 | plastic | 1.64 | 22.5 | 4.53 |
| 4 | | 13.412 | (ASP) | 0.900 | | | | |
| 5 | Lens 2 | −2.241 | (ASP) | 0.241 | plastic | 1.54 | 55.9 | −8.79 |
| 6 | | −4.437 | (ASP) | 0.126 | | | | |
| 7 | Lens 3 | 5.185 | (ASP) | 0.239 | plastic | 1.64 | 22.5 | 8.28 |
| 8 | | −602.716 | (ASP) | 0.308 | | | | |
| 9 | Lens 4 | −1.291 | (ASP) | 0.276 | plastic | 1.64 | 22.5 | −19.92 |
| 10 | | −1.559 | (ASP) | 0.190 | | | | |
| 11 | Lens 5 | 1.278 | (ASP) | 0.636 | plastic | 1.64 | 22.5 | 9.75 |
| 12 | | 1.311 | (ASP) | 0.800 | | | | |
| 13 | IR band-pass element | infinity | | 0.210 | glass | 1.52 | 64.2 | |
| 14 | | infinity | | 0.497 | | | | |
| 15 | Image plane | infinity | | infinity | | | | |

TABLE 16

| Aspheric Coefficients | | |
|---|---|---|
| surface | 3 | 4 |
| K: | 4.9896E−01 | 7.4268E+01 |
| A: | −2.2403E−02 | −2.2842E−02 |
| B: | −1.5166E−03 | 3.4383E−02 |
| C: | 5.6548E−02 | −9.8539E−02 |
| D: | −1.2093E−01 | 1.0824E−01 |
| E: | 1.0169E−01 | −6.3442E−02 |
| F: | −4.0182E−02 | 1.8319E−02 |
| G: | 6.0186E−03 | −2.0725E−03 |
| surface | 5 | 6 |
| K: | 4.7167E−01 | 7.3210E−02 |
| A: | −3.0654E−02 | −8.0096E−04 |
| B: | 6.4626E−02 | −1.1623E−01 |
| C: | −3.1267E−02 | 2.1932E−01 |
| D: | 1.0757E−03 | −2.0451E−01 |
| E: | 8.0535E−03 | 1.0394E−01 |
| F: | −3.4015E−03 | −2.7996E−02 |
| G: | 4.7294E−04 | 3.1393E−03 |
| surface | 7 | 8 |
| K: | −6.1158E+01 | −2.8823E+01 |
| A: | 3.1540E−02 | −1.2157E−01 |
| B: | −1.6264E−01 | 2.1428E−01 |
| C: | 1.8123E−01 | −2.5803E−01 |
| D: | −1.4375E−01 | 1.3759E−01 |
| E: | 5.7506E−02 | −2.8031E−02 |
| F: | −1.0198E−02 | −1.4807E−03 |
| G: | 6.6329E−04 | 9.8588E−04 |
| surface | 9 | 10 |
| K: | −6.3270E+00 | −3.7559E+00 |
| A: | −1.6522E−01 | −1.4117E−01 |
| B: | 5.4832E−01 | 4.9058E−01 |
| C: | −7.0702E−01 | −6.4750E−01 |
| D: | 4.3695E−01 | 4.3857E−01 |
| E: | −1.2814E−01 | −1.6655E−01 |
| F: | 1.3061E−02 | 3.4207E−02 |
| G: | 4.4975E−04 | −2.9383E−03 |
| surface | 11 | 12 |
| K: | −6.4864E+00 | −5.9771E+00 |
| A: | 3.9515E−02 | 5.8500E−02 |
| B: | −4.7164E−02 | −8.0843E−02 |
| C: | 3.6433E−03 | 3.6716E−02 |
| D: | 4.4424E−03 | −1.0136E−02 |
| E: | −1.3929E−03 | 1.7193E−03 |
| F: | 1.6209E−04 | −1.6094E−04 |
| G: | −6.8456E−06 | 6.2801E−06 |

In the eighth embodiment, the equation of the aspheric surface profiles of the aforementioned lens elements is the same as the equation of the first embodiment. Also, the definitions of these parameters shown in the following table are the same as those stated in the first embodiment with corresponding values for the eighth embodiment, so an explanation in this regard will not be provided again.

Moreover, these parameters can be calculated from Table 15 and Table 16 as the following values and satisfy the following conditions:

| Embodiment 8 | | | |
|---|---|---|---|
| f[mm] | 3.80 | R7/R8 | 0.83 |
| Fno | 1.45 | R9/R10 | 0.97 |
| FOV[deg.] | 68.9 | f3/R5 | 1.60 |
| f1/f | 1.19 | TL/(CT2 + CT3 + CT4) | 6.75 |
| f3/f1 | 1.83 | TL/f | 1.34 |

-continued

| Embodiment 8 | | | |
|---|---|---|---|
| f12/f3 | 0.88 | BFL/TL | 0.30 |
| f12/f1234 | 1.27 | TL/IMH | 1.89 |
| f/f123 | 0.83 | f2 × CT2/(R3 × R4) | −0.21 |
| f1/R1 | 1.91 | (f1 × CT1 × R1)/ | 0.71 |
| R4/R3 | 1.98 | (f3 × CT3 × R5) | |

Figure 9A:
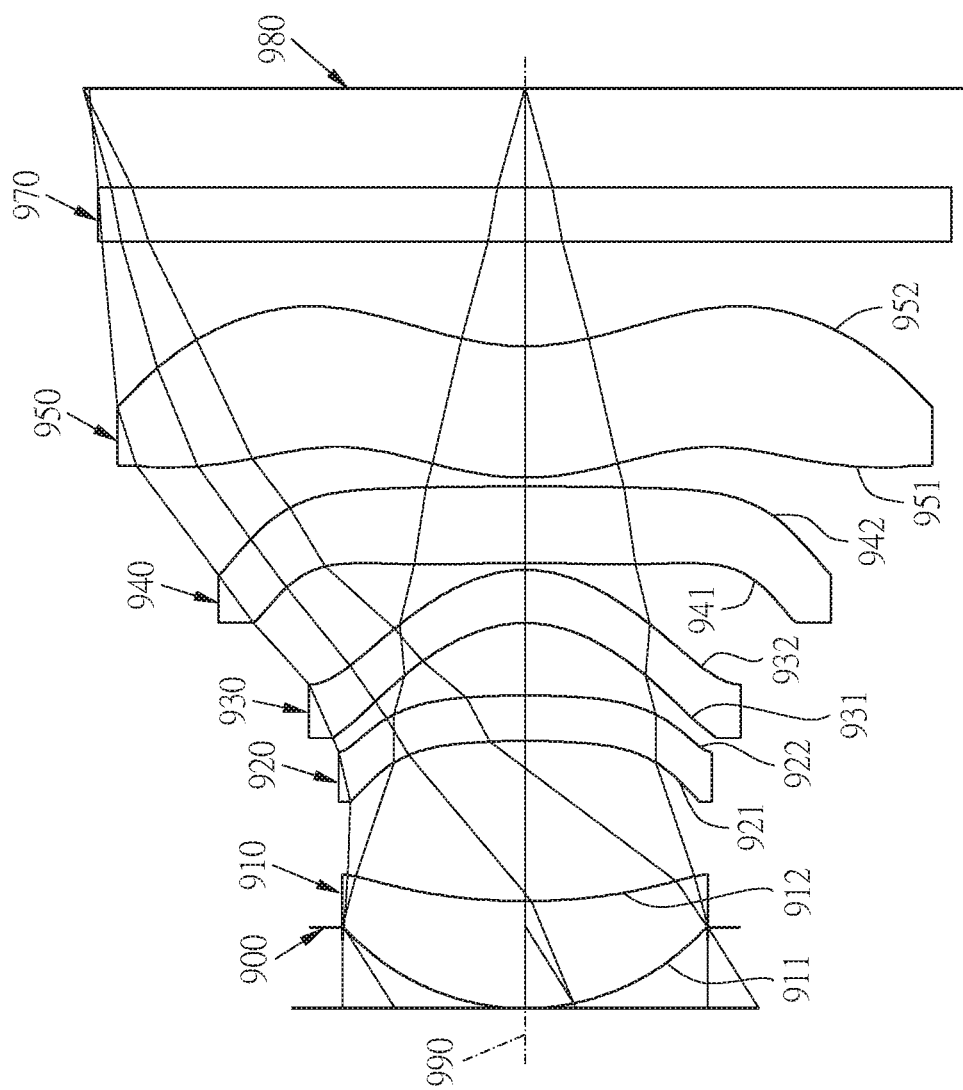
FIG. 9A shows a five-piece infrared single focus lens system in accordance with a ninth embodiment of the present invention.
Figure 9B:
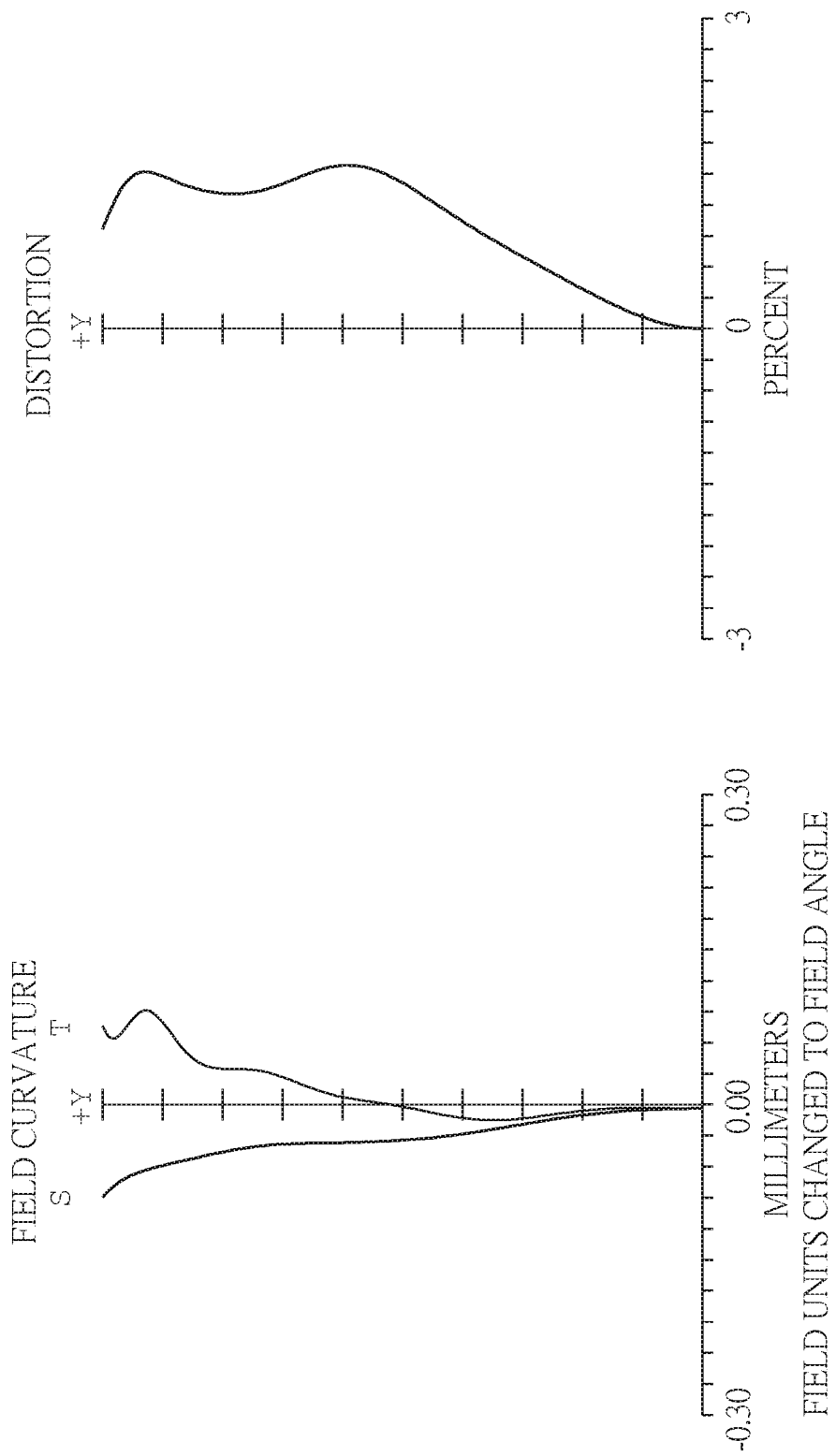
FIG. 9B shows the image plane curve and the distortion curve of the ninth embodiment of the present invention.

Referring to FIGS. 9A and 9B, FIG. 9A shows a five-piece infrared single focus lens system in accordance with a ninth embodiment of the present invention, and FIG. 9B shows, in order from left to right, the image plane curve and the distortion curve of the ninth embodiment of the present invention. A five-piece infrared single focus lens system in accordance with the ninth embodiment of the present invention comprises a stop 900 and a lens group. The lens group comprises, in order from an object side to an image side: a first lens element 910, a second lens element 920, a third lens element 930, a fourth lens element 940, a fifth lens element 950, an IR band-pass element 970, and an image plane 980, wherein the five-piece infrared single focus lens system has a total of five lens elements with refractive power. The stop 900 is disposed between an object to be imaged and the first lens element 910.

The first lens element 910 with a positive refractive power has an object-side surface 911 being convex near an optical axis 990 and an image-side surface 912 being concave near the optical axis 990, the object-side surface 911 and the image-side surface 912 are aspheric, and the first lens element 910 is made of plastic material.

The second lens element 920 with a positive refractive power has an object-side surface 921 being concave near the optical axis 990 and an image-side surface 922 being convex near the optical axis 990, the object-side surface 921 and the image-side surface 922 are aspheric, and the second lens element 920 is made of plastic material.

The third lens element 930 with a positive refractive power has an object-side surface 931 being concave near the optical axis 990 and an image-side surface 932 being convex near the optical axis 990, the object-side surface 931 and the image-side surface 932 are aspheric, and the third lens element 930 is made of plastic material.

The fourth lens element 940 with a negative refractive power has an object-side surface 941 being concave near the optical axis 990 and an image-side surface 942 being convex near the optical axis 990, the object-side surface 941 and the image-side surface 942 are aspheric, and the fourth lens element 940 is made of plastic material.

The fifth lens element 950 with a positive refractive power has an object-side surface 951 being convex near the optical axis 990 and an image-side surface 952 being concave near the optical axis 990, the object-side surface 951 and the image-side surface 952 are aspheric and are provided with at least one inflection point, the fifth lens element 950 is made of plastic material.

The IR band-pass element 970 made of glass is located between the fifth lens element 950 and the image plane 980 and has no influence on the focal length of the five-piece infrared single focus lens system.

The detailed optical data of the ninth embodiment is shown in table 17, and the aspheric surface data is shown in table 18.

TABLE 17

Embodiment 9
f(focal length) = 3.77 mm, Fno = 1.60, FOV = 72.6 deg.

| surface | | Curvature Radius | | Thickness | Material | Index | Abbe # | Focal length |
|---|---|---|---|---|---|---|---|---|
| 0 | object | infinity | | 700.000 | | | | |
| 1 | test surface | infinity | | 0.443 | | | | |
| 2 | stop | infinity | | −0.443 | | | | |
| 3 | Lens 1 | 1.781 | (ASP) | 0.584 | plastic | 1.64 | 22.5 | 4.40 |
| 4 | | 4.471 | (ASP) | 0.872 | | | | |
| 5 | Lens 2 | −8.740 | (ASP) | 0.249 | plastic | 1.64 | 22.5 | 108.39 |
| 6 | | −7.820 | (ASP) | 0.395 | | | | |
| 7 | Lens 3 | −0.974 | (ASP) | 0.290 | plastic | 1.64 | 22.5 | 12.17 |
| 8 | | −0.961 | (ASP) | 0.040 | | | | |
| 9 | Lens 4 | −7.145 | (ASP) | 0.418 | plastic | 1.64 | 22.5 | −22.31 |
| 10 | | −15.082 | (ASP) | 0.046 | | | | |
| 11 | Lens 5 | 1.974 | (ASP) | 0.716 | plastic | 1.64 | 22.5 | 52.24 |
| 12 | | 1.810 | (ASP) | 0.567 | | | | |
| 13 | IR band-pass element | infinity | | 0.300 | glass | 1.52 | 64.2 | |
| 14 | | infinity | | 0.541 | | | | |
| 15 | Image plane | infinity | | infinity | | | | |

TABLE 18

Aspheric Coefficients

| surface | 3 | 4 |
|---|---|---|
| K: | −1.1535E+00 | −5.3829E+00 |
| A: | 1.7992E−02 | 2.5655E−02 |
| B: | 4.5445E−02 | −5.8649E−02 |
| C: | −6.1952E−02 | 1.3066E−01 |
| D: | 6.2202E−02 | −1.2795E−01 |
| E: | −4.1308E−02 | 3.1163E−02 |
| F: | 1.9359E−02 | 2.3830E−02 |
| G: | −4.8313E−03 | −1.2672E−02 |

| surface | 5 | 6 |
|---|---|---|
| K: | 5.8371E+01 | 5.5183E+00 |
| A: | −9.1915E−02 | −7.3476E−02 |
| B: | −9.6227E−02 | −7.4240E−02 |
| C: | 3.0972E−02 | −1.0775E−02 |
| D: | 3.5642E−02 | 5.2069E−02 |
| E: | −5.7312E−02 | −3.4997E−02 |
| F: | 6.3584E−04 | −9.6922E−04 |
| G: | 2.5506E−02 | 1.1384E−02 |

| surface | 7 | 8 |
|---|---|---|
| K: | −5.7217E−01 | −1.0944E+00 |
| A: | 1.1620E−01 | 9.6078E−02 |
| B: | 1.9217E−02 | −5.7900E−02 |
| C: | −5.2786E−02 | 2.6861E−02 |
| D: | 4.1614E−02 | 7.5686E−04 |
| E: | 5.4502E−04 | 1.3267E−03 |
| F: | 4.5549E−03 | −1.8156E−04 |
| G: | −4.0488E−03 | −2.6586E−04 |

| surface | 9 | 10 |
|---|---|---|
| K: | −9.9515E+01 | −1.1257E+01 |
| A: | 1.1646E−01 | 4.3281E−02 |
| B: | −8.4466E−02 | −3.6994E−02 |
| C: | 1.6825E−02 | 1.0262E−02 |
| D: | 1.5703E−03 | −2.2918E−03 |
| E: | −1.2738E−03 | 1.0403E−04 |
| F: | −3.9395E−04 | 4.0806E−05 |
| G: | 1.6276E−04 | −1.3737E−06 |

TABLE 18-continued

Aspheric Coefficients

| surface | 11 | 12 |
|---|---|---|
| K: | −3.1785E+00 | −4.2097E+00 |
| A: | −5.5535E−02 | −5.3392E−02 |
| B: | −3.4077E−02 | 5.6956E−04 |
| C: | 2.3791E−02 | 1.6280E−03 |
| D: | −5.7393E−03 | −2.6416E−04 |
| E: | 6.7644E−04 | 2.7137E−05 |
| F: | −3.7651E−05 | −4.1211E−06 |
| G: | 7.2264E−07 | 3.0598E−07 |

In the ninth embodiment, the equation of the aspheric surface profiles of the aforementioned lens elements is the same as the equation of the first embodiment. Also, the definitions of these parameters shown in the following table are the same as those stated in the first embodiment with corresponding values for the ninth embodiment, so an explanation in this regard will not be provided again.

Moreover, these parameters can be calculated from Table 17 and Table 18 as the following values and satisfy the following conditions:

| Embodiment 9 | | | |
|---|---|---|---|
| f[mm] | 3.77 | R7/R8 | 0.47 |
| Fno | 1.60 | R9/R10 | 1.09 |
| FOV[deg.] | 72.6 | f3/R5 | −12.49 |
| f1/f | 1.17 | TL/(CT2 + CT3 + CT4) | 5.24 |
| f3/f1 | 2.76 | TL/f | 1.33 |
| f12/f3 | 0.36 | BFL/TL | 0.28 |
| f12/f1234 | 0.96 | TL/IMH | 1.78 |
| f/f123 | 0.94 | f2 × CT2/(R3 × R4) | 0.40 |
| f1/R1 | 2.47 | (f1 × CT1 × R1)/ (f3 × CT3 × R5) | −1.33 |
| R4/R3 | 0.90 | | |

In the present five-piece infrared single focus lens system, the lens elements can be made of plastic or glass. If the lens elements are made of plastic, the cost will be effectively reduced. If the lens elements are made of glass, there is more freedom in distributing the refractive power of the five-piece infrared single focus lens system. Plastic lens elements can have aspheric surfaces, which allow more design parameter freedom (than spherical surfaces), so as to reduce the aberration and the number of the lens elements, as well as the total track length of the five-piece infrared single focus lens system.

In the present five-piece infrared single focus lens system, if the object-side or the image-side surface of the lens elements with refractive power is convex and the location of the convex surface is not defined, the object-side or the image-side surface of the lens elements near the optical axis is convex. If the object-side or the image-side surface of the lens elements is concave and the location of the concave surface is not defined, the object-side or the image-side surface of the lens elements near the optical axis is concave.

The five-piece infrared single focus lens system of the present invention can be used in focusing optical systems and can obtain better image quality. The five-piece infrared single focus lens system of the present invention can also be used in electronic imaging systems, such as, 3D image capturing, digital camera, mobile device, digital flat panel or vehicle camera.

While we have shown and described various embodiments in accordance with the present invention, it should be clear to those skilled in the art that further embodiments may be made without departing from the scope of the present invention.

What is claimed is:

1. A five-piece infrared single focus lens system comprising a stop and a lens group having five lens elements, in order from an object side to an image side, comprising:
    the stop;
    a first lens element with a positive refractive power, having an object-side surface being convex near an optical axis, at least one of the object-side surface and an image-side surface of the first lens element being aspheric;
    a second lens element with a refractive power, having an object-side surface being concave near the optical axis and an image-side surface being convex near the optical axis, at least one of the object-side surface and the image-side surface of the second lens element being aspheric;
    a third lens element with a positive refractive power, at least one of an object-side surface and an image-side surface of the third lens element being aspheric;
    a fourth lens element with a refractive power, having an object-side surface being concave near the optical axis and an image-side surface being convex near the optical axis, at least one of the object-side surface and the image-side surface of the fourth lens element being aspheric; and
    a fifth lens element with a positive refractive power, having an object-side surface being convex near the optical axis and an image-side surface being concave near the optical axis, at least one of the object-side surface and the image-side surface of the fifth lens element being aspheric and provided with at least one inflection point;
    wherein a focal length of the first lens element is f1, a focal length of the third lens element is f3, a central thickness of the first lens element along the optical axis is CT1, a central thickness of the third lens element along the optical axis is CT3, a radius of curvature of the object-side surface of the first lens element is R1, a radius of curvature of the object-side surface of the third lens element is R5, a distance from the object-side surface of the first lens element to an image plane along the optical axis is TL, half of an image height that can be captured by the five-piece infrared single focus lens system on the image plane is IMH, and they satisfy the relation: $-1.60<(f1\times CT1\times R1)/(f3\times CT3\times R5)<2.43$, and $1.78\leq TL/IMH<2.6$.

2. The five-piece infrared single focus lens system as claimed in claim 1, wherein a focal length of the five-piece infrared single focus lens system is f, the focal length of the first lens element is f1, and they satisfy the relation: $0.9<f1/f<2.2$.

3. The five-piece infrared single focus lens system as claimed in claim 1, wherein the focal length of the first lens element is f1, the focal length of the third lens element is f3, and they satisfy the relation: $0.74<f3/f1<4.30$.

4. The five-piece infrared single focus lens system as claimed in claim 1, wherein a focal length of the first lens element and the second lens element combined is f12, the focal length of the third lens element is f3, and they satisfy the relation: $0.28<f12/f3<3.07$.

5. The five-piece infrared single focus lens system as claimed in claim 1, wherein a focal length of the first lens element and the second lens element combined is f12, a focal length of the first lens element, the second lens element, the third lens element and the fourth lens element combined is f1234, and they satisfy the relation: $0.70<f12/f1234<3.91$.

6. The five-piece infrared single focus lens system as claimed in claim 1, wherein a focal length of the five-piece infrared single focus lens system is f, a focal length of the first lens element, the second lens element and the third lens element combined is f123, and they satisfy the relation: $0.36<f/f123<1.33$.

7. The five-piece infrared single focus lens system as claimed in claim 1, wherein the focal length of the first lens element is f1, the radius of curvature of the object-side surface of the first lens element is R1, and they satisfy the relation: $0.98<f1/R1<2.97$.

8. The five-piece infrared single focus lens system as claimed in claim 1, wherein a radius of curvature of the image-side surface of the second lens element is R4, a radius of curvature of the object-side surface of the second lens element is R3, and they satisfy the relation: $0.71<R4/R3<2.75$.

9. The five-piece infrared single focus lens system as claimed in claim 1, wherein a radius of curvature of the object-side surface of the fourth lens element is R7, a radius of curvature of the image-side surface of the fourth lens element is R8, and they satisfy the relation: $0.38<R7/R8<7.81$.

10. The five-piece infrared single focus lens system as claimed in claim 1, wherein a radius of curvature of the object-side surface of the fifth lens element is R9, a radius of curvature of the image-side surface of the fifth lens element is R10, and they satisfy the relation: $0.66<R9/R10<1.75$.

11. The five-piece infrared single focus lens system as claimed in claim 1, wherein the focal length of the third lens element is f3, the radius of curvature of the object-side surface of the third lens element is R5, and they satisfy the relation: $-15.0<f3/R5<4.9$.

12. The five-piece infrared single focus lens system as claimed in claim 1, wherein the distance from the object-side surface of the first lens element to an image plane along the optical axis is TL, a central thickness of the second lens element along the optical axis is CT2, the central thickness of the third lens element along the optical axis is CT3, a central thickness of the fourth lens element along the optical axis is CT4, and they satisfy the relation: $2.5<TL/(CT2+CT3+CT4)<8.1$.

13. The five-piece infrared single focus lens system as claimed in claim 1, wherein the distance from the object-side surface of the first lens element to an image plane along the optical axis is TL, a focal length of the five-piece infrared single focus lens system is f, and they satisfy the relation: $1.06<TL/f<2.07$.

14. The five-piece infrared single focus lens system as claimed in claim 1, wherein a distance from the image-side surface of the fifth lens element to an image plane along the optical axis is BFL, the distance from the object-side surface of the first lens element to an image plane along the optical axis is TL, and they satisfy the relation: $0.15<BFL/TL<0.39$.

15. The five-piece infrared single focus lens system as claimed in claim 1, wherein a focal length of the second lens element is f2, a central thickness of the second lens element along the optical axis is CT2, a radius of curvature of the object-side surface of the second lens element is R3, a radius of curvature of the image-side surface of the second lens element is R4, and they satisfy the relation: $-1.72<f2\times CT2/(R3\times R4)<0.48$.

* * * * *